US012803891B2

(12) United States Patent
Mayya et al.

(10) Patent No.: US 12,803,891 B2
(45) **Date of Patent: *Nov. 17, 2026**

(54) METHOD AND SYSTEM OF CONNECTING TO A MULTIPATH HUB IN A CLUSTER

(71) Applicant: VeloCloud Networks, LLC, Santa Clara, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Nitin Kumar Ananda, Mountain View, CA (US)

(73) Assignee: VeloCloud Networks, LLC, Santa Clara, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 18/780,390

(22) Filed: Jul. 22, 2024

(65) Prior Publication Data

US 2024/0380669 A1 Nov. 14, 2024

Related U.S. Application Data

(63) Continuation of application No. 17/827,972, filed on May 30, 2022, now Pat. No. 12,047,244, which is a (Continued)

(51) Int. Cl.
*H04L 43/0811* (2022.01)
*H04L 9/40* (2022.01)
(Continued)

(52) U.S. Cl.
CPC ...... *H04L 43/0811* (2013.01); *H04L 12/4633* (2013.01); *H04L 12/66* (2013.01);
(Continued)

(58) Field of Classification Search
CPC ............. H04L 43/0811; H04L 12/4633; H04L 41/0803; H04L 43/0876; H04L 47/125; H04L 63/0272; H04L 63/029
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1483270 A 3/2004
CN 1926809 A 3/2007
(Continued)

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

(Continued)

*Primary Examiner* — Ivan O Latorre
(74) *Attorney, Agent, or Firm* — BainwoodHuang

(57) ABSTRACT

In one aspect, a computerized method useful for connecting to a multipath hub in a cluster includes the step of, with a gateway in a same network as the cluster, receiving, from a branch edge, a request to connect to a logical identifier (ID) of the multipath hub. The gateway recognizes a logical ID representing a cluster. The gateway determines a least-loaded edge in the cluster to be the multipath hub. The gateway returns a connectivity information for the multipath hub. The branch edge configures a tunnel to the multipath hub.

20 Claims, 9 Drawing Sheets

Related U.S. Application Data continuation of application No. 16/945,867, filed on Aug. 1, 2020, now Pat. No. 11,349,722, which is a continuation of application No. 15/707,124, filed on Sep. 18, 2017, now Pat. No. 10,778,528.

(60) Provisional application No. 62/523,477, filed on Jun. 22, 2017, provisional application No. 62/457,816, filed on Feb. 11, 2017.

(51) Int. Cl.

| | |
|---|---|
| ***H04L 12/46*** | (2006.01) |
| ***H04L 12/66*** | (2006.01) |
| ***H04L 41/0803*** | (2022.01) |
| ***H04L 43/0876*** | (2022.01) |
| ***H04L 43/20*** | (2022.01) |
| ***H04L 45/03*** | (2022.01) |
| ***H04L 45/24*** | (2022.01) |
| ***H04L 45/28*** | (2022.01) |
| ***H04L 47/125*** | (2022.01) |

(52) U.S. Cl.

CPC ...... *H04L 41/0803* (2013.01); *H04L 43/0876* (2013.01); *H04L 43/20* (2022.05); *H04L 45/03* (2022.05); *H04L 45/24* (2013.01); *H04L 45/28* (2013.01); *H04L 47/125* (2013.01); *H04L 63/0272* (2013.01); *H04L 63/029* (2013.01)

(56) References Cited

U.S. PATENT DOCUMENTS 6,154,465 A 11/2000 Pickett
6,157,648 A 12/2000 Voit et al.
6,201,810 B1 3/2001 Masuda et al.
6,363,378 B1 3/2002 Conklin et al.
6,445,682 B1 9/2002 Weitz
6,744,775 B1 6/2004 Beshai et al.
6,976,087 B1 12/2005 Westfall et al.
7,003,481 B2 2/2006 Banka et al.
7,280,476 B2 10/2007 Anderson
7,313,629 B1 12/2007 Nucci et al.
7,320,017 B1 1/2008 Kurapati et al.
7,373,660 B1 5/2008 Guichard et al.
7,581,022 B1 8/2009 Griffin et al.
7,680,925 B2 3/2010 Sathyanarayana et al.
7,681,236 B2 3/2010 Tamura et al.
7,751,409 B1 7/2010 Carolan
7,962,458 B2 6/2011 Holenstein et al.
8,051,185 B2 11/2011 Lee et al.
8,094,575 B1 1/2012 Vadlakonda et al.
8,094,659 B1 1/2012 Arad
8,111,692 B2 2/2012 Ray
8,141,156 B1 3/2012 Mao et al.
8,224,971 B1 7/2012 Miller et al.
8,228,928 B2 7/2012 Parandekar et al.
8,243,589 B1 8/2012 Trost et al.
8,259,566 B2 9/2012 Chen et al.
8,274,891 B2 9/2012 Averi et al.
8,301,749 B1 10/2012 Finklestein et al.
8,385,227 B1 2/2013 Downey
8,516,129 B1 8/2013 Skene
8,566,452 B1 10/2013 Goodwin et al.
8,588,066 B2 11/2013 Goel et al.
8,630,291 B2 1/2014 Shaffer et al.
8,661,295 B1 2/2014 Khanna et al.
8,724,456 B1 5/2014 Hong et al.
8,724,503 B2 5/2014 Johnsson et al.
8,745,177 B1 6/2014 Kazerani et al.
8,769,129 B2 7/2014 Watsen et al.
8,797,874 B2 8/2014 Yu et al.
8,799,504 B2 8/2014 Capone et al.
8,804,745 B1 8/2014 Sinn
8,806,482 B1 8/2014 Nagargadde et al.
8,855,071 B1 10/2014 Sankaran et al.
8,856,339 B2 10/2014 Mestery et al.
8,964,548 B1 2/2015 Keralapura et al.
8,989,199 B1 3/2015 Sella et al.
9,009,217 B1 4/2015 Nagargadde et al.
9,015,299 B1 4/2015 Shah
9,019,837 B2 4/2015 Lue et al.
9,055,000 B1 6/2015 Ghosh et al.
9,060,025 B2 6/2015 Xu
9,071,607 B2 6/2015 Twitchell, Jr.
9,075,771 B1 7/2015 Gawali et al.
9,100,329 B1 8/2015 Jiang et al.
9,135,037 B1 9/2015 Petrescu-Prahova et al.
9,137,334 B2 9/2015 Zhou
9,154,327 B1 10/2015 Marino et al.
9,203,764 B2 12/2015 Shirazipour et al.
9,225,591 B2 12/2015 Beheshti-Zavareh et al.
9,258,212 B2 2/2016 Pfeifer et al.
9,306,949 B1 4/2016 Richard et al.
9,323,561 B2 4/2016 Ayala et al.
9,336,040 B2 5/2016 Dong et al.
9,354,983 B1 5/2016 Yenamandra et al.
9,356,943 B1 5/2016 Lopilato et al.
9,379,981 B1 6/2016 Zhou et al.
9,413,724 B2 8/2016 Xu
9,419,878 B2 8/2016 Hsiao et al.
9,432,245 B1 8/2016 Sorenson et al.
9,438,566 B2 9/2016 Zhang et al.
9,450,817 B1 9/2016 Bahadur et al.
9,450,852 B1 9/2016 Chen et al.
9,462,010 B1 10/2016 Stevenson
9,467,478 B1 10/2016 Khan et al.
9,485,163 B1 11/2016 Fries et al.
9,521,067 B2 12/2016 Michael et al.
9,525,564 B2 12/2016 Lee
9,542,219 B1 1/2017 Bryant et al.
9,559,951 B1 1/2017 Sajassi et al.
9,563,423 B1 2/2017 Pittman
9,602,389 B1 3/2017 Maveli et al.
9,608,917 B1 3/2017 Anderson et al.
9,608,962 B1 3/2017 Chang
9,614,748 B1 4/2017 Battersby et al.
9,621,460 B2 4/2017 Mehta et al.
9,641,551 B1 5/2017 Kariyanahalli
9,648,547 B1 5/2017 Hart et al.
9,665,432 B2 5/2017 Kruse et al.
9,686,127 B2 6/2017 Ramachandran et al.
9,692,714 B1 6/2017 Nair et al.
9,715,401 B2 7/2017 Devine et al.
9,717,021 B2 7/2017 Hughes et al.
9,722,815 B2 8/2017 Mukundan et al.
9,747,249 B2 8/2017 Cherian et al.
9,755,965 B1 9/2017 Yadav et al.
9,787,559 B1 10/2017 Schroeder
9,807,004 B2 10/2017 Koley et al.
9,819,540 B1 11/2017 Bahadur et al.
9,819,565 B2 11/2017 Djukic et al.
9,825,822 B1 11/2017 Holland
9,825,911 B1 11/2017 Brandwine
9,825,992 B2 11/2017 Xu
9,832,128 B1 11/2017 Ashner et al.
9,832,205 B2 11/2017 Santhi et al.
9,875,355 B1 1/2018 Williams
9,906,401 B1 2/2018 Rao
9,923,826 B2 3/2018 Murgia
9,930,011 B1 3/2018 Clemons, Jr. et al.
9,935,829 B1 4/2018 Miller et al.
9,942,787 B1 4/2018 Tillotson
9,996,370 B1 6/2018 Khafizov et al.
10,038,601 B1 7/2018 Becker et al.
10,057,183 B2 8/2018 Salle et al.
10,057,294 B2 8/2018 Xu
10,116,593 B1 10/2018 Sinn et al.
10,135,789 B2 11/2018 Mayya et al.
10,142,226 B1 11/2018 Wu et al.
10,178,032 B1 1/2019 Freitas
10,178,037 B2 1/2019 Appleby et al.
10,187,289 B1 1/2019 Chen et al.
10,200,264 B2 2/2019 Menon et al.

(56) References Cited

U.S. PATENT DOCUMENTS

| | | | |
|---|---|---|---|
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,263,848 | B2 | 4/2019 | Wolting |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,461,993 | B2 | 10/2019 | Turabi et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,550,093 | B2 | 2/2020 | Ojima et al. |
| 10,554,538 | B2 | 2/2020 | Spohn et al. |
| 10,560,431 | B1 | 2/2020 | Chen et al. |
| 10,565,464 | B2 | 2/2020 | Han et al. |
| 10,567,519 | B1 | 2/2020 | Mukhopadhyaya et al. |
| 10,574,482 | B2 | 2/2020 | Oré et al. |
| 10,574,528 | B2 | 2/2020 | Mayya et al. |
| 10,594,516 | B2 | 3/2020 | Cidon et al. |
| 10,594,591 | B2 | 3/2020 | Houjyo et al. |
| 10,594,659 | B2 | 3/2020 | El-Moussa et al. |
| 10,608,844 | B2 | 3/2020 | Cidon et al. |
| 10,630,505 | B2 | 4/2020 | Rubenstein et al. |
| 10,637,889 | B2 | 4/2020 | Ermagan et al. |
| 10,666,460 | B2 | 5/2020 | Cidon et al. |
| 10,666,497 | B2 | 5/2020 | Tahhan et al. |
| 10,686,625 | B2 | 6/2020 | Cidon et al. |
| 10,693,739 | B1 | 6/2020 | Naseri et al. |
| 10,708,144 | B2 | 7/2020 | Mohan et al. |
| 10,715,382 | B2 | 7/2020 | Guan et al. |
| 10,715,427 | B2 | 7/2020 | Raj et al. |
| 10,749,711 | B2 | 8/2020 | Mukundan et al. |
| 10,778,466 | B2 | 9/2020 | Cidon et al. |
| 10,778,528 | B2 | 9/2020 | Mayya et al. |
| 10,778,557 | B2 | 9/2020 | Ganichev et al. |
| 10,805,114 | B2 | 10/2020 | Cidon et al. |
| 10,805,272 | B2 | 10/2020 | Mayya et al. |
| 10,819,564 | B2 | 10/2020 | Turabi et al. |
| 10,826,775 | B1 | 11/2020 | Moreno et al. |
| 10,841,131 | B2 | 11/2020 | Cidon et al. |
| 10,911,374 | B1 | 2/2021 | Kumar et al. |
| 10,924,388 | B1 | 2/2021 | Burns et al. |
| 10,938,693 | B2 | 3/2021 | Mayya et al. |
| 10,951,529 | B2 | 3/2021 | Duan et al. |
| 10,958,479 | B2 | 3/2021 | Cidon et al. |
| 10,959,098 | B2 | 3/2021 | Cidon et al. |
| 10,992,558 | B1 | 4/2021 | Silva et al. |
| 10,992,568 | B2 | 4/2021 | Michael et al. |
| 10,999,100 | B2 | 5/2021 | Cidon et al. |
| 10,999,137 | B2 | 5/2021 | Cidon et al. |
| 10,999,165 | B2 | 5/2021 | Cidon et al. |
| 10,999,197 | B2 | 5/2021 | Hooda et al. |
| 11,005,684 | B2 | 5/2021 | Cidon |
| 11,018,995 | B2 | 5/2021 | Cidon et al. |
| 11,044,190 | B2 | 6/2021 | Ramaswamy et al. |
| 11,050,588 | B2 | 6/2021 | Mayya et al. |
| 11,050,644 | B2 | 6/2021 | Hegde et al. |
| 11,071,005 | B2 | 7/2021 | Shen et al. |
| 11,089,111 | B2 | 8/2021 | Markuze et al. |
| 11,095,612 | B1 | 8/2021 | Oswal et al. |
| 11,102,032 | B2 | 8/2021 | Cidon et al. |
| 11,108,595 | B2 | 8/2021 | Knutsen et al. |
| 11,108,851 | B1 | 8/2021 | Kurmala et al. |
| 11,115,347 | B2 | 9/2021 | Gupta et al. |
| 11,115,426 | B1 | 9/2021 | Pazhyannur et al. |
| 11,115,480 | B2 | 9/2021 | Markuze et al. |
| 11,121,962 | B2 | 9/2021 | Michael et al. |
| 11,121,985 | B2 | 9/2021 | Cidon et al. |
| 11,128,492 | B2 | 9/2021 | Sethi et al. |
| 11,146,632 | B2 | 10/2021 | Rubenstein |
| 11,153,230 | B2 | 10/2021 | Cidon et al. |
| 11,171,885 | B2 | 11/2021 | Cidon et al. |
| 11,212,140 | B2 | 12/2021 | Mukundan et al. |
| 11,212,238 | B2 | 12/2021 | Cidon et al. |
| 11,223,514 | B2 | 1/2022 | Mayya et al. |
| 11,245,641 | B2 | 2/2022 | Ramaswamy et al. |
| 11,252,079 | B2 | 2/2022 | Michael et al. |
| 11,252,105 | B2 | 2/2022 | Cidon et al. |
| 11,252,106 | B2 | 2/2022 | Cidon et al. |
| 11,258,728 | B2 | 2/2022 | Cidon et al. |
| 11,310,170 | B2 | 4/2022 | Cidon et al. |
| 11,323,307 | B2 | 5/2022 | Mayya et al. |
| 11,349,722 | B2 | 5/2022 | Mayya et al. |
| 11,363,124 | B2 | 6/2022 | Markuze et al. |
| 11,374,904 | B2 | 6/2022 | Mayya et al. |
| 11,375,005 | B1 | 6/2022 | Rolando et al. |
| 11,381,474 | B1 | 7/2022 | Kumar et al. |
| 11,381,499 | B1 | 7/2022 | Ramaswamy et al. |
| 11,388,086 | B1 | 7/2022 | Ramaswamy et al. |
| 11,394,640 | B2 | 7/2022 | Ramaswamy et al. |
| 11,418,997 | B2 | 8/2022 | Devadoss et al. |
| 11,438,789 | B2 | 9/2022 | Devadoss et al. |
| 11,444,865 | B2 | 9/2022 | Ramaswamy et al. |
| 11,444,872 | B2 | 9/2022 | Mayya et al. |
| 11,477,127 | B2 | 10/2022 | Ramaswamy et al. |
| 11,489,720 | B1 | 11/2022 | Kempanna et al. |
| 11,489,783 | B2 | 11/2022 | Ramaswamy et al. |
| 11,502,936 | B2 | 11/2022 | Tootaghaj et al. |
| 11,509,571 | B1 | 11/2022 | Ramaswamy et al. |
| 11,516,049 | B2 | 11/2022 | Cidon et al. |
| 11,522,780 | B1 | 12/2022 | Wallace et al. |
| 11,526,434 | B1 | 12/2022 | Brooker et al. |
| 11,533,248 | B2 | 12/2022 | Mayya et al. |
| 11,552,874 | B1 | 1/2023 | Pragada et al. |
| 11,575,591 | B2 | 2/2023 | Ramaswamy et al. |
| 11,575,600 | B2 | 2/2023 | Markuze et al. |
| 11,582,144 | B2 | 2/2023 | Ramaswamy et al. |
| 11,582,298 | B2 | 2/2023 | Hood et al. |
| 11,601,356 | B2 | 3/2023 | Gandhi et al. |
| 11,606,225 | B2 | 3/2023 | Cidon et al. |
| 11,606,286 | B2 | 3/2023 | Michael et al. |
| 11,606,314 | B2 | 3/2023 | Cidon et al. |
| 11,606,712 | B2 | 3/2023 | Devadoss et al. |
| 11,611,507 | B2 | 3/2023 | Ramaswamy et al. |
| 11,637,768 | B2 | 4/2023 | Ramaswamy et al. |
| 11,677,720 | B2 | 6/2023 | Mayya et al. |
| 11,689,959 | B2 | 6/2023 | Devadoss et al. |
| 11,700,196 | B2 | 7/2023 | Michael et al. |
| 11,706,126 | B2 | 7/2023 | Silva et al. |
| 11,706,127 | B2 | 7/2023 | Michael et al. |
| 11,709,710 | B2 | 7/2023 | Markuze et al. |
| 11,716,286 | B2 | 8/2023 | Ramaswamy et al. |
| 11,722,925 | B2 | 8/2023 | Devadoss et al. |
| 11,729,065 | B2 | 8/2023 | Ramaswamy et al. |
| 11,792,127 | B2 | 10/2023 | Ramaswamy et al. |
| 2002/0049687 | A1 | 4/2002 | Helsper et al. |
| 2002/0075542 | A1 | 6/2002 | Kumar et al. |
| 2002/0085488 | A1 | 7/2002 | Kobayashi |
| 2002/0087716 | A1 | 7/2002 | Mustafa |
| 2002/0152306 | A1 | 10/2002 | Tuck |
| 2002/0186682 | A1 | 12/2002 | Kawano et al. |
| 2002/0198840 | A1 | 12/2002 | Banka et al. |
| 2003/0050061 | A1 | 3/2003 | Wu et al. |
| 2003/0061269 | A1 | 3/2003 | Hathaway et al. |
| 2003/0088697 | A1 | 5/2003 | Matsuhira |
| 2003/0112766 | A1 | 6/2003 | Riedel et al. |
| 2003/0112808 | A1 | 6/2003 | Solomon |
| 2003/0126468 | A1 | 7/2003 | Markham |
| 2003/0161313 | A1 | 8/2003 | Jinmei et al. |
| 2003/0161321 | A1 | 8/2003 | Karam et al. |
| 2003/0189919 | A1 | 10/2003 | Gupta et al. |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2004/0165601 | A1 | 8/2004 | Liu et al. |
| 2004/0224771 | A1 | 11/2004 | Chen et al. |
| 2005/0078690 | A1 | 4/2005 | DeLangis |

(56) References Cited

U.S. PATENT DOCUMENTS

2005/0149604 A1 7/2005 Navada
2005/0154790 A1 7/2005 Nagata et al.
2005/0172161 A1 8/2005 Cruz et al.
2005/0195754 A1 9/2005 Nosella
2005/0210479 A1 9/2005 Andjelic
2005/0265255 A1 12/2005 Kodialam et al.
2006/0002291 A1 1/2006 Alicherry et al.
2006/0034335 A1 2/2006 Karaoguz et al.
2006/0114838 A1 6/2006 Mandavilli et al.
2006/0171365 A1 8/2006 Borella
2006/0182034 A1 8/2006 Klinker et al.
2006/0182035 A1 8/2006 Vasseur
2006/0193247 A1 8/2006 Naseh et al.
2006/0193252 A1 8/2006 Naseh et al.
2006/0195605 A1 8/2006 Sundarrajan et al.
2006/0245414 A1 11/2006 Susai et al.
2007/0050594 A1 3/2007 Augsburg et al.
2007/0064604 A1 3/2007 Chen et al.
2007/0064702 A1 3/2007 Bates et al.
2007/0083727 A1 4/2007 Johnston et al.
2007/0091794 A1 4/2007 Filsfils et al.
2007/0103548 A1 5/2007 Carter
2007/0115812 A1 5/2007 Hughes
2007/0121486 A1 5/2007 Guichard et al.
2007/0130325 A1 6/2007 Lesser
2007/0162619 A1 7/2007 Aloni et al.
2007/0162639 A1 7/2007 Chu et al.
2007/0177511 A1 8/2007 Das et al.
2007/0195797 A1 8/2007 Patel et al.
2007/0237081 A1 10/2007 Kodialam et al.
2007/0260746 A1 11/2007 Mirtorabi et al.
2007/0268882 A1 11/2007 Breslau et al.
2008/0002670 A1 1/2008 Bugenhagen et al.
2008/0049621 A1 2/2008 McGuire et al.
2008/0055241 A1 3/2008 Goldenberg et al.
2008/0080509 A1 4/2008 Khanna et al.
2008/0095187 A1 4/2008 Jung et al.
2008/0117930 A1 5/2008 Chakareski et al.
2008/0144532 A1 6/2008 Chamarajanagar et al.
2008/0168086 A1 7/2008 Miller et al.
2008/0175150 A1 7/2008 Bolt et al.
2008/0181116 A1 7/2008 Kavanaugh et al.
2008/0219276 A1 9/2008 Shah
2008/0240121 A1 10/2008 Xiong et al.
2008/0263218 A1 10/2008 Beerends et al.
2009/0013210 A1 1/2009 McIntosh et al.
2009/0028092 A1 1/2009 Rothschild
2009/0125617 A1 5/2009 Klessig et al.
2009/0141642 A1 6/2009 Sun
2009/0154463 A1 6/2009 Hines et al.
2009/0182874 A1 7/2009 Morford et al.
2009/0247204 A1 10/2009 Sennett et al.
2009/0268605 A1 10/2009 Campbell et al.
2009/0274045 A1 11/2009 Meier et al.
2009/0276657 A1 11/2009 Wetmore et al.
2009/0303880 A1 12/2009 Maltz et al.
2010/0008361 A1 1/2010 Guichard et al.
2010/0017802 A1 1/2010 Lojewski
2010/0046532 A1 2/2010 Okita
2010/0061379 A1 3/2010 Parandekar et al.
2010/0080129 A1 4/2010 Strahan et al.
2010/0088440 A1 4/2010 Banks et al.
2010/0091782 A1 4/2010 Hiscock
2010/0091823 A1 4/2010 Retana et al.
2010/0098092 A1 4/2010 Luo et al.
2010/0100768 A1 4/2010 Yamamoto et al.
2010/0107162 A1 4/2010 Edwards et al.
2010/0118727 A1 5/2010 Draves et al.
2010/0118886 A1 5/2010 Saavedra
2010/0128600 A1 5/2010 Srinivasmurthy et al.
2010/0165985 A1 7/2010 Sharma et al.
2010/0191884 A1 7/2010 Holenstein et al.
2010/0223621 A1 9/2010 Joshi et al.
2010/0226246 A1 9/2010 Proulx
2010/0290422 A1 11/2010 Haigh et al.
2010/0309841 A1 12/2010 Conte
2010/0309912 A1 12/2010 Mehta et al.
2010/0322255 A1 12/2010 Hao et al.
2010/0332657 A1 12/2010 Elyashev et al.
2011/0001604 A1 1/2011 Ludlow et al.
2011/0007752 A1 1/2011 Silva et al.
2011/0032939 A1 2/2011 Nozaki et al.
2011/0035187 A1 2/2011 DeJori et al.
2011/0040814 A1 2/2011 Higgins
2011/0075674 A1 3/2011 Li et al.
2011/0078783 A1 3/2011 Duan et al.
2011/0107139 A1 5/2011 Middlecamp et al.
2011/0110370 A1 5/2011 Moreno et al.
2011/0141877 A1 6/2011 Xu et al.
2011/0142041 A1 6/2011 Imai
2011/0153909 A1 6/2011 Dong
2011/0235509 A1 9/2011 Szymanski
2011/0255397 A1 10/2011 Kadakia et al.
2011/0302663 A1 12/2011 Prodan et al.
2012/0008630 A1 1/2012 Ould-Brahim
2012/0027013 A1 2/2012 Napierala
2012/0039309 A1 2/2012 Evans et al.
2012/0099601 A1 4/2012 Haddad et al.
2012/0136697 A1 5/2012 Peles et al.
2012/0140935 A1 6/2012 Kruglick
2012/0157068 A1 6/2012 Eichen et al.
2012/0173694 A1 7/2012 Yan et al.
2012/0173919 A1 7/2012 Patel et al.
2012/0182940 A1 7/2012 Taleb et al.
2012/0221955 A1 8/2012 Raleigh et al.
2012/0227093 A1 9/2012 Shatzkamer et al.
2012/0240185 A1 9/2012 Kapoor et al.
2012/0250682 A1 10/2012 Vincent et al.
2012/0250686 A1 10/2012 Vincent et al.
2012/0266026 A1 10/2012 Chikkalingaiah et al.
2012/0281706 A1 11/2012 Agarwal et al.
2012/0287818 A1 11/2012 Corti et al.
2012/0300615 A1 11/2012 Kempf et al.
2012/0307659 A1 12/2012 Yamada
2012/0317270 A1 12/2012 Vrbaski et al.
2012/0317291 A1 12/2012 Wolfe
2013/0007505 A1 1/2013 Spear
2013/0019005 A1 1/2013 Hui et al.
2013/0021968 A1 1/2013 Reznik et al.
2013/0044764 A1 2/2013 Casado et al.
2013/0051237 A1 2/2013 Ong
2013/0051399 A1 2/2013 Zhang et al.
2013/0054763 A1 2/2013 Merwe et al.
2013/0086267 A1 4/2013 Gelenbe et al.
2013/0097304 A1 4/2013 Asthana et al.
2013/0103729 A1 4/2013 Cooney et al.
2013/0103834 A1 4/2013 Dzerve et al.
2013/0117530 A1 5/2013 Kim et al.
2013/0124718 A1 5/2013 Griffith et al.
2013/0124911 A1 5/2013 Griffith et al.
2013/0124912 A1 5/2013 Griffith et al.
2013/0128757 A1 5/2013 Chowdhary et al.
2013/0128889 A1 5/2013 Mathur et al.
2013/0142201 A1 6/2013 Kim et al.
2013/0170354 A1 7/2013 Takashima et al.
2013/0173768 A1 7/2013 Kundu et al.
2013/0173788 A1 7/2013 Song
2013/0182712 A1 7/2013 Aguayo et al.
2013/0185446 A1 7/2013 Zeng et al.
2013/0185729 A1 7/2013 Vasic et al.
2013/0191688 A1 7/2013 Agarwal et al.
2013/0223226 A1 8/2013 Narayanan et al.
2013/0223454 A1 8/2013 Dunbar et al.
2013/0235870 A1 9/2013 Tripathi et al.
2013/0238782 A1 9/2013 Zhao et al.
2013/0242718 A1 9/2013 Zhang
2013/0254599 A1 9/2013 Katkar et al.
2013/0258839 A1 10/2013 Wang et al.
2013/0258847 A1 10/2013 Zhang et al.
2013/0258939 A1 10/2013 Wang
2013/0266015 A1 10/2013 Qu et al.
2013/0266019 A1 10/2013 Qu et al.
2013/0283364 A1 10/2013 Chang et al.
2013/0286846 A1 10/2013 Atlas et al.

(56) References Cited

U.S. PATENT DOCUMENTS

| | | | |
|---|---|---|---|
| 2013/0297611 | A1 | 11/2013 | Moritz et al. |
| 2013/0297770 | A1 | 11/2013 | Zhang |
| 2013/0301469 | A1 | 11/2013 | Suga |
| 2013/0301642 | A1 | 11/2013 | Radhakrishnan et al. |
| 2013/0308444 | A1 | 11/2013 | Sem-Jacobsen et al. |
| 2013/0315242 | A1 | 11/2013 | Wang et al. |
| 2013/0315243 | A1 | 11/2013 | Huang et al. |
| 2013/0329548 | A1 | 12/2013 | Nakil et al. |
| 2013/0329601 | A1 | 12/2013 | Mn et al. |
| 2013/0329734 | A1 | 12/2013 | Chesla et al. |
| 2013/0346470 | A1 | 12/2013 | Obstfeld et al. |
| 2014/0016464 | A1 | 1/2014 | Shirazipour et al. |
| 2014/0019604 | A1 | 1/2014 | Twitchell, Jr. |
| 2014/0019750 | A1 | 1/2014 | Dodgson et al. |
| 2014/0040975 | A1 | 2/2014 | Raleigh et al. |
| 2014/0064283 | A1 | 3/2014 | Balus et al. |
| 2014/0071832 | A1 | 3/2014 | Johnsson et al. |
| 2014/0092907 | A1 | 4/2014 | Sridhar et al. |
| 2014/0108665 | A1 | 4/2014 | Arora et al. |
| 2014/0112171 | A1 | 4/2014 | Pasdar |
| 2014/0115584 | A1 | 4/2014 | Mudigonda et al. |
| 2014/0122559 | A1 | 5/2014 | Branson et al. |
| 2014/0123135 | A1 | 5/2014 | Huang et al. |
| 2014/0126418 | A1 | 5/2014 | Brendel et al. |
| 2014/0156818 | A1 | 6/2014 | Hunt |
| 2014/0156823 | A1 | 6/2014 | Liu et al. |
| 2014/0157363 | A1 | 6/2014 | Banerjee |
| 2014/0160935 | A1 | 6/2014 | Zecharia et al. |
| 2014/0164560 | A1 | 6/2014 | Ko et al. |
| 2014/0164617 | A1 | 6/2014 | Jalan et al. |
| 2014/0164718 | A1 | 6/2014 | Schaik et al. |
| 2014/0173113 | A1 | 6/2014 | Vemuri et al. |
| 2014/0173331 | A1 | 6/2014 | Martin et al. |
| 2014/0181824 | A1 | 6/2014 | Saund et al. |
| 2014/0189074 | A1 | 7/2014 | Parker |
| 2014/0201642 | A1 | 7/2014 | Vicat-Blanc |
| 2014/0208317 | A1 | 7/2014 | Nakagawa |
| 2014/0219135 | A1 | 8/2014 | Li et al. |
| 2014/0223507 | A1 | 8/2014 | Xu |
| 2014/0226664 | A1 | 8/2014 | Chen et al. |
| 2014/0229210 | A1 | 8/2014 | Sharifian et al. |
| 2014/0233564 | A1 | 8/2014 | Lue et al. |
| 2014/0244851 | A1 | 8/2014 | Lee |
| 2014/0258535 | A1 | 9/2014 | Zhang |
| 2014/0269690 | A1 | 9/2014 | Tu |
| 2014/0279862 | A1 | 9/2014 | Dietz et al. |
| 2014/0280499 | A1 | 9/2014 | Basavaiah et al. |
| 2014/0310282 | A1 | 10/2014 | Sprague et al. |
| 2014/0317440 | A1 | 10/2014 | Biermayr et al. |
| 2014/0321277 | A1 | 10/2014 | Lynn, Jr. et al. |
| 2014/0337500 | A1 | 11/2014 | Lee |
| 2014/0337674 | A1 | 11/2014 | Ivancic et al. |
| 2014/0341109 | A1 | 11/2014 | Cartmell et al. |
| 2014/0351394 | A1 | 11/2014 | Elisha |
| 2014/0355441 | A1 | 12/2014 | Jain |
| 2014/0365834 | A1 | 12/2014 | Stone et al. |
| 2014/0372582 | A1 | 12/2014 | Ghanwani et al. |
| 2015/0003240 | A1 | 1/2015 | Drwiega et al. |
| 2015/0016249 | A1 | 1/2015 | Mukundan et al. |
| 2015/0029864 | A1 | 1/2015 | Raileanu et al. |
| 2015/0039744 | A1 | 2/2015 | Niazi et al. |
| 2015/0046572 | A1 | 2/2015 | Cheng et al. |
| 2015/0052247 | A1 | 2/2015 | Threefoot et al. |
| 2015/0052517 | A1 | 2/2015 | Raghu et al. |
| 2015/0056960 | A1 | 2/2015 | Egner et al. |
| 2015/0058917 | A1 | 2/2015 | Xu |
| 2015/0088942 | A1 | 3/2015 | Shah |
| 2015/0089628 | A1 | 3/2015 | Lang |
| 2015/0092603 | A1 | 4/2015 | Aguayo et al. |
| 2015/0096011 | A1 | 4/2015 | Watt |
| 2015/0100958 | A1 | 4/2015 | Banavalikar et al. |
| 2015/0106809 | A1 | 4/2015 | Reddy et al. |
| 2015/0124603 | A1 | 5/2015 | Ketheesan et al. |
| 2015/0134777 | A1 | 5/2015 | Onoue |
| 2015/0139238 | A1 | 5/2015 | Pourzandi et al. |
| 2015/0146539 | A1 | 5/2015 | Mehta et al. |
| 2015/0163152 | A1 | 6/2015 | Li |
| 2015/0169340 | A1 | 6/2015 | Haddad et al. |
| 2015/0172121 | A1 | 6/2015 | Farkas et al. |
| 2015/0172169 | A1 | 6/2015 | DeCusatis et al. |
| 2015/0188823 | A1 | 7/2015 | Williams et al. |
| 2015/0189009 | A1 | 7/2015 | Bemmel |
| 2015/0195178 | A1 | 7/2015 | Bhattacharya et al. |
| 2015/0201036 | A1 | 7/2015 | Nishiki et al. |
| 2015/0222543 | A1 | 8/2015 | Song |
| 2015/0222638 | A1 | 8/2015 | Morley |
| 2015/0236945 | A1 | 8/2015 | Michael et al. |
| 2015/0236962 | A1 | 8/2015 | Veres et al. |
| 2015/0244617 | A1 | 8/2015 | Nakil et al. |
| 2015/0249644 | A1 | 9/2015 | Xu |
| 2015/0257081 | A1 | 9/2015 | Ramanujan et al. |
| 2015/0264055 | A1 | 9/2015 | Budhani et al. |
| 2015/0271056 | A1 | 9/2015 | Chunduri et al. |
| 2015/0271104 | A1 | 9/2015 | Chikkamath et al. |
| 2015/0271303 | A1 | 9/2015 | Neginhal et al. |
| 2015/0281004 | A1 | 10/2015 | Kakadia et al. |
| 2015/0312142 | A1 | 10/2015 | Barabash et al. |
| 2015/0312760 | A1 | 10/2015 | O'Toole |
| 2015/0317169 | A1 | 11/2015 | Sinha et al. |
| 2015/0319057 | A1 | 11/2015 | Jocha et al. |
| 2015/0326426 | A1 | 11/2015 | Luo et al. |
| 2015/0334025 | A1 | 11/2015 | Rader |
| 2015/0334696 | A1 | 11/2015 | Gu et al. |
| 2015/0341271 | A1 | 11/2015 | Gomez |
| 2015/0349978 | A1 | 12/2015 | Wu et al. |
| 2015/0350907 | A1 | 12/2015 | Timariu et al. |
| 2015/0358232 | A1 | 12/2015 | Chen et al. |
| 2015/0358236 | A1 | 12/2015 | Roach et al. |
| 2015/0363221 | A1 | 12/2015 | Terayama et al. |
| 2015/0363733 | A1 | 12/2015 | Brown |
| 2015/0365323 | A1 | 12/2015 | Duminuco et al. |
| 2015/0372943 | A1 | 12/2015 | Hasan et al. |
| 2015/0372982 | A1 | 12/2015 | Herle et al. |
| 2015/0381407 | A1 | 12/2015 | Wang et al. |
| 2015/0381462 | A1 | 12/2015 | Choi et al. |
| 2015/0381493 | A1 | 12/2015 | Bansal et al. |
| 2016/0019317 | A1 | 1/2016 | Pawar et al. |
| 2016/0020844 | A1 | 1/2016 | Hart et al. |
| 2016/0021597 | A1 | 1/2016 | Hart et al. |
| 2016/0035183 | A1 | 2/2016 | Buchholz et al. |
| 2016/0036924 | A1 | 2/2016 | Koppolu et al. |
| 2016/0036938 | A1 | 2/2016 | Aviles et al. |
| 2016/0037434 | A1 | 2/2016 | Gopal et al. |
| 2016/0072669 | A1 | 3/2016 | Saavedra |
| 2016/0072684 | A1 | 3/2016 | Manuguri et al. |
| 2016/0080268 | A1 | 3/2016 | Anand et al. |
| 2016/0080502 | A1 | 3/2016 | Yadav et al. |
| 2016/0105353 | A1 | 4/2016 | Cociglio |
| 2016/0105392 | A1 | 4/2016 | Thakkar et al. |
| 2016/0105471 | A1 | 4/2016 | Nunes et al. |
| 2016/0105488 | A1 | 4/2016 | Thakkar et al. |
| 2016/0117185 | A1 | 4/2016 | Fang et al. |
| 2016/0134461 | A1 | 5/2016 | Sampath et al. |
| 2016/0134527 | A1 | 5/2016 | Kwak et al. |
| 2016/0134528 | A1 | 5/2016 | Lin et al. |
| 2016/0134591 | A1 | 5/2016 | Liao et al. |
| 2016/0142373 | A1 | 5/2016 | Ossipov |
| 2016/0147607 | A1 | 5/2016 | Dornemann et al. |
| 2016/0150055 | A1 | 5/2016 | Choi |
| 2016/0164832 | A1 | 6/2016 | Bellagamba et al. |
| 2016/0164914 | A1 | 6/2016 | Madhav et al. |
| 2016/0173338 | A1 | 6/2016 | Wolting |
| 2016/0191363 | A1 | 6/2016 | Haraszti et al. |
| 2016/0191374 | A1 | 6/2016 | Singh et al. |
| 2016/0192403 | A1 | 6/2016 | Gupta et al. |
| 2016/0197834 | A1 | 7/2016 | Luft |
| 2016/0197835 | A1 | 7/2016 | Luft |
| 2016/0198003 | A1 | 7/2016 | Luft |
| 2016/0205071 | A1 | 7/2016 | Cooper et al. |
| 2016/0210209 | A1 | 7/2016 | Verkaik et al. |
| 2016/0212773 | A1 | 7/2016 | Kanderholm et al. |
| 2016/0218947 | A1 | 7/2016 | Hughes et al. |
| 2016/0218951 | A1 | 7/2016 | Vasseur et al. |
| 2016/0234099 | A1 | 8/2016 | Jiao |

(56) References Cited

U.S. PATENT DOCUMENTS

| | | | |
|---|---|---|---|
| 2016/0234161 | A1 | 8/2016 | Banerjee et al. |
| 2016/0255169 | A1 | 9/2016 | Kovvuri et al. |
| 2016/0255542 | A1 | 9/2016 | Hughes et al. |
| 2016/0261493 | A1 | 9/2016 | Li |
| 2016/0261495 | A1 | 9/2016 | Xia et al. |
| 2016/0261506 | A1 | 9/2016 | Hegde et al. |
| 2016/0261639 | A1 | 9/2016 | Xu |
| 2016/0269298 | A1 | 9/2016 | Li et al. |
| 2016/0269926 | A1 | 9/2016 | Sundaram |
| 2016/0285736 | A1 | 9/2016 | Gu |
| 2016/0299775 | A1 | 10/2016 | Madapurath et al. |
| 2016/0301471 | A1 | 10/2016 | Kunz et al. |
| 2016/0308762 | A1 | 10/2016 | Teng et al. |
| 2016/0315912 | A1 | 10/2016 | Mayya et al. |
| 2016/0323377 | A1 | 11/2016 | Einkauf et al. |
| 2016/0328159 | A1 | 11/2016 | Coddington et al. |
| 2016/0330111 | A1 | 11/2016 | Manghirmalani et al. |
| 2016/0337202 | A1 | 11/2016 | Ben-Itzhak et al. |
| 2016/0352588 | A1 | 12/2016 | Subbarayan et al. |
| 2016/0353268 | A1 | 12/2016 | Senarath et al. |
| 2016/0359738 | A1 | 12/2016 | Sullenberger et al. |
| 2016/0366187 | A1 | 12/2016 | Kamble |
| 2016/0371153 | A1 | 12/2016 | Dornemann |
| 2016/0378527 | A1 | 12/2016 | Zamir |
| 2016/0380886 | A1 | 12/2016 | Blair et al. |
| 2016/0380906 | A1 | 12/2016 | Hodique et al. |
| 2017/0005986 | A1 | 1/2017 | Bansal et al. |
| 2017/0006499 | A1 | 1/2017 | Hampel et al. |
| 2017/0012870 | A1 | 1/2017 | Blair et al. |
| 2017/0019428 | A1 | 1/2017 | Cohn |
| 2017/0024260 | A1 | 1/2017 | Chandrasekaran et al. |
| 2017/0026273 | A1 | 1/2017 | Yao et al. |
| 2017/0026283 | A1 | 1/2017 | Williams et al. |
| 2017/0026355 | A1 | 1/2017 | Mathaiyan et al. |
| 2017/0034046 | A1 | 2/2017 | Cai et al. |
| 2017/0034052 | A1 | 2/2017 | Chanda et al. |
| 2017/0034129 | A1 | 2/2017 | Sawant et al. |
| 2017/0048296 | A1 | 2/2017 | Ramalho et al. |
| 2017/0053258 | A1 | 2/2017 | Carney et al. |
| 2017/0055131 | A1 | 2/2017 | Kong et al. |
| 2017/0063674 | A1 | 3/2017 | Maskalik et al. |
| 2017/0063782 | A1 | 3/2017 | Jain et al. |
| 2017/0063783 | A1 | 3/2017 | Yong et al. |
| 2017/0063794 | A1 | 3/2017 | Jain et al. |
| 2017/0064005 | A1 | 3/2017 | Lee |
| 2017/0075710 | A1 | 3/2017 | Prasad et al. |
| 2017/0093625 | A1 | 3/2017 | Pera et al. |
| 2017/0097841 | A1 | 4/2017 | Chang et al. |
| 2017/0104653 | A1 | 4/2017 | Badea et al. |
| 2017/0104755 | A1 | 4/2017 | Arregoces et al. |
| 2017/0109212 | A1 | 4/2017 | Gaurav et al. |
| 2017/0111246 | A1 | 4/2017 | Shaw et al. |
| 2017/0118067 | A1 | 4/2017 | Vedula |
| 2017/0118173 | A1 | 4/2017 | Arramreddy et al. |
| 2017/0123939 | A1 | 5/2017 | Maheshwari et al. |
| 2017/0126475 | A1 | 5/2017 | Mahkonen et al. |
| 2017/0126516 | A1 | 5/2017 | Tiagi et al. |
| 2017/0126564 | A1 | 5/2017 | Mayya et al. |
| 2017/0134186 | A1 | 5/2017 | Mukundan et al. |
| 2017/0134520 | A1 | 5/2017 | Abbasi et al. |
| 2017/0139789 | A1 | 5/2017 | Fries et al. |
| 2017/0142000 | A1 | 5/2017 | Cai et al. |
| 2017/0149637 | A1 | 5/2017 | Banikazemi et al. |
| 2017/0155557 | A1 | 6/2017 | Desai et al. |
| 2017/0155566 | A1 | 6/2017 | Martinsen et al. |
| 2017/0155590 | A1 | 6/2017 | Dillon et al. |
| 2017/0163473 | A1 | 6/2017 | Sadana et al. |
| 2017/0171024 | A1 | 6/2017 | Anerousis et al. |
| 2017/0171310 | A1 | 6/2017 | Gardner |
| 2017/0180220 | A1 | 6/2017 | Leckey et al. |
| 2017/0181210 | A1 | 6/2017 | Nadella et al. |
| 2017/0195161 | A1 | 7/2017 | Ruel et al. |
| 2017/0195169 | A1 | 7/2017 | Mills et al. |
| 2017/0201568 | A1 | 7/2017 | Hussam et al. |
| 2017/0201585 | A1 | 7/2017 | Doraiswamy et al. |
| 2017/0207976 | A1 | 7/2017 | Rovner et al. |
| 2017/0214545 | A1 | 7/2017 | Cheng et al. |
| 2017/0214701 | A1 | 7/2017 | Hasan |
| 2017/0223117 | A1 | 8/2017 | Messerli et al. |
| 2017/0236060 | A1 | 8/2017 | Ignatyev |
| 2017/0237710 | A1 | 8/2017 | Mayya et al. |
| 2017/0242784 | A1 | 8/2017 | Heorhiadi et al. |
| 2017/0257260 | A1 | 9/2017 | Govindan et al. |
| 2017/0257309 | A1 | 9/2017 | Appanna |
| 2017/0264496 | A1 | 9/2017 | Ao et al. |
| 2017/0279717 | A1 | 9/2017 | Bethers et al. |
| 2017/0279741 | A1 | 9/2017 | Elias et al. |
| 2017/0279803 | A1 | 9/2017 | Desai et al. |
| 2017/0280474 | A1 | 9/2017 | Vesterinen et al. |
| 2017/0288987 | A1 | 10/2017 | Pasupathy et al. |
| 2017/0289002 | A1 | 10/2017 | Ganguli et al. |
| 2017/0289027 | A1 | 10/2017 | Ratnasingham |
| 2017/0295264 | A1 | 10/2017 | Touitou et al. |
| 2017/0302501 | A1 | 10/2017 | Shi et al. |
| 2017/0302565 | A1 | 10/2017 | Ghobadi et al. |
| 2017/0310641 | A1 | 10/2017 | Jiang et al. |
| 2017/0310691 | A1 | 10/2017 | Vasseur et al. |
| 2017/0317945 | A1 | 11/2017 | Guo et al. |
| 2017/0317954 | A1 | 11/2017 | Masurekar et al. |
| 2017/0317969 | A1 | 11/2017 | Masurekar et al. |
| 2017/0317974 | A1 | 11/2017 | Masurekar et al. |
| 2017/0324628 | A1 | 11/2017 | Dhanabalan |
| 2017/0337086 | A1 | 11/2017 | Zhu et al. |
| 2017/0339022 | A1 | 11/2017 | Hegde et al. |
| 2017/0339054 | A1 | 11/2017 | Yadav et al. |
| 2017/0339070 | A1 | 11/2017 | Chang et al. |
| 2017/0346722 | A1 | 11/2017 | Smith et al. |
| 2017/0364419 | A1 | 12/2017 | Lo |
| 2017/0366445 | A1 | 12/2017 | Nemirovsky et al. |
| 2017/0366467 | A1 | 12/2017 | Martin et al. |
| 2017/0373950 | A1 | 12/2017 | Szilagyi et al. |
| 2017/0374174 | A1 | 12/2017 | Evens et al. |
| 2018/0006995 | A1 | 1/2018 | Bickhart et al. |
| 2018/0007005 | A1 | 1/2018 | Chanda et al. |
| 2018/0007123 | A1 | 1/2018 | Cheng et al. |
| 2018/0013636 | A1 | 1/2018 | Seetharamaiah et al. |
| 2018/0014051 | A1 | 1/2018 | Phillips et al. |
| 2018/0020035 | A1 | 1/2018 | Boggia et al. |
| 2018/0034668 | A1 | 2/2018 | Mayya et al. |
| 2018/0041425 | A1 | 2/2018 | Zhang |
| 2018/0041470 | A1 | 2/2018 | Schultz et al. |
| 2018/0062875 | A1 | 3/2018 | Tumuluru |
| 2018/0062914 | A1 | 3/2018 | Boutros et al. |
| 2018/0062917 | A1 | 3/2018 | Chandrashekhar et al. |
| 2018/0063036 | A1 | 3/2018 | Chandrashekhar et al. |
| 2018/0063193 | A1 | 3/2018 | Chandrashekhar et al. |
| 2018/0063233 | A1 | 3/2018 | Park |
| 2018/0063743 | A1 | 3/2018 | Tumuluru et al. |
| 2018/0069924 | A1 | 3/2018 | Tumuluru et al. |
| 2018/0074909 | A1 | 3/2018 | Bishop et al. |
| 2018/0077081 | A1 | 3/2018 | Lauer et al. |
| 2018/0077202 | A1 | 3/2018 | Xu |
| 2018/0084081 | A1 | 3/2018 | Kuchibhotla et al. |
| 2018/0091370 | A1 | 3/2018 | Arai |
| 2018/0097725 | A1 | 4/2018 | Wood et al. |
| 2018/0114569 | A1 | 4/2018 | Strachan et al. |
| 2018/0123910 | A1 | 5/2018 | Fitzgibbon |
| 2018/0123946 | A1 | 5/2018 | Ramachandran et al. |
| 2018/0131608 | A1 | 5/2018 | Jiang et al. |
| 2018/0131615 | A1 | 5/2018 | Zhang |
| 2018/0131720 | A1 | 5/2018 | Hobson et al. |
| 2018/0145899 | A1 | 5/2018 | Rao |
| 2018/0159796 | A1 | 6/2018 | Wang et al. |
| 2018/0159856 | A1 | 6/2018 | Gujarathi |
| 2018/0167378 | A1 | 6/2018 | Kostyukov et al. |
| 2018/0176073 | A1 | 6/2018 | Dubey et al. |
| 2018/0176082 | A1 | 6/2018 | Katz et al. |
| 2018/0176130 | A1 | 6/2018 | Banerjee et al. |
| 2018/0176252 | A1 | 6/2018 | Nimmagadda et al. |
| 2018/0181423 | A1 | 6/2018 | Gunda et al. |
| 2018/0205746 | A1 | 7/2018 | Boutnaru et al. |
| 2018/0213472 | A1 | 7/2018 | Ishii et al. |
| 2018/0219765 | A1 | 8/2018 | Michael et al. |
| 2018/0219766 | A1 | 8/2018 | Michael et al. |

(56) References Cited

U.S. PATENT DOCUMENTS

| | | | |
|---|---|---|---|
| 2018/0234300 | A1 | 8/2018 | Mayya et al. |
| 2018/0248790 | A1 | 8/2018 | Tan et al. |
| 2018/0260125 | A1 | 9/2018 | Botes et al. |
| 2018/0261085 | A1 | 9/2018 | Liu et al. |
| 2018/0262468 | A1 | 9/2018 | Kumar et al. |
| 2018/0270104 | A1 | 9/2018 | Zheng et al. |
| 2018/0278541 | A1 | 9/2018 | Wu et al. |
| 2018/0287907 | A1 | 10/2018 | Kulshreshtha et al. |
| 2018/0295101 | A1 | 10/2018 | Gehrmann |
| 2018/0295529 | A1 | 10/2018 | Jen et al. |
| 2018/0302286 | A1 | 10/2018 | Mayya et al. |
| 2018/0302321 | A1 | 10/2018 | Manthiramoorthy et al. |
| 2018/0307851 | A1 | 10/2018 | Lewis |
| 2018/0316606 | A1 | 11/2018 | Sung et al. |
| 2018/0351855 | A1 | 12/2018 | Sood et al. |
| 2018/0351862 | A1 | 12/2018 | Jeganathan et al. |
| 2018/0351863 | A1 | 12/2018 | Vairavakkalai et al. |
| 2018/0351882 | A1 | 12/2018 | Jeganathan et al. |
| 2018/0359323 | A1 | 12/2018 | Madden |
| 2018/0367445 | A1 | 12/2018 | Bajaj |
| 2018/0373558 | A1 | 12/2018 | Chang et al. |
| 2018/0375744 | A1 | 12/2018 | Mayya et al. |
| 2018/0375824 | A1 | 12/2018 | Mayya et al. |
| 2018/0375967 | A1 | 12/2018 | Pithawala et al. |
| 2019/0013883 | A1 | 1/2019 | Vargas et al. |
| 2019/0014038 | A1 | 1/2019 | Ritchie |
| 2019/0020588 | A1 | 1/2019 | Twitchell, Jr. |
| 2019/0020627 | A1 | 1/2019 | Yuan |
| 2019/0021085 | A1 | 1/2019 | Mochizuki et al. |
| 2019/0028378 | A1 | 1/2019 | Houjyo et al. |
| 2019/0028552 | A1 | 1/2019 | Johnson et al. |
| 2019/0036808 | A1 | 1/2019 | Shenoy et al. |
| 2019/0036810 | A1 | 1/2019 | Michael et al. |
| 2019/0036813 | A1 | 1/2019 | Shenoy et al. |
| 2019/0046056 | A1 | 2/2019 | Khachaturian et al. |
| 2019/0058657 | A1 | 2/2019 | Chunduri et al. |
| 2019/0058709 | A1 | 2/2019 | Kempf et al. |
| 2019/0068470 | A1 | 2/2019 | Mirsky |
| 2019/0068493 | A1 | 2/2019 | Ram et al. |
| 2019/0068500 | A1 | 2/2019 | Hira |
| 2019/0075083 | A1 | 3/2019 | Mayya et al. |
| 2019/0081894 | A1 | 3/2019 | Yousaf et al. |
| 2019/0103990 | A1 | 4/2019 | Cidon et al. |
| 2019/0103991 | A1 | 4/2019 | Cidon et al. |
| 2019/0103992 | A1 | 4/2019 | Cidon et al. |
| 2019/0103993 | A1 | 4/2019 | Cidon et al. |
| 2019/0104035 | A1 | 4/2019 | Cidon et al. |
| 2019/0104049 | A1 | 4/2019 | Cidon et al. |
| 2019/0104050 | A1 | 4/2019 | Cidon et al. |
| 2019/0104051 | A1 | 4/2019 | Cidon et al. |
| 2019/0104052 | A1 | 4/2019 | Cidon et al. |
| 2019/0104053 | A1 | 4/2019 | Cidon et al. |
| 2019/0104063 | A1 | 4/2019 | Cidon et al. |
| 2019/0104064 | A1 | 4/2019 | Cidon et al. |
| 2019/0104109 | A1 | 4/2019 | Cidon et al. |
| 2019/0104111 | A1 | 4/2019 | Cidon et al. |
| 2019/0104413 | A1 | 4/2019 | Cidon et al. |
| 2019/0109769 | A1 | 4/2019 | Jain et al. |
| 2019/0132221 | A1 | 5/2019 | Boutros et al. |
| 2019/0132234 | A1 | 5/2019 | Dong et al. |
| 2019/0132322 | A1 | 5/2019 | Song et al. |
| 2019/0140889 | A1 | 5/2019 | Mayya et al. |
| 2019/0140890 | A1 | 5/2019 | Mayya et al. |
| 2019/0149525 | A1 | 5/2019 | Gunda et al. |
| 2019/0158371 | A1 | 5/2019 | Dillon et al. |
| 2019/0158605 | A1 | 5/2019 | Markuze et al. |
| 2019/0199539 | A1 | 6/2019 | Deng et al. |
| 2019/0220703 | A1 | 7/2019 | Prakash et al. |
| 2019/0222499 | A1 | 7/2019 | Chen et al. |
| 2019/0238364 | A1 | 8/2019 | Boutros et al. |
| 2019/0238446 | A1 | 8/2019 | Barzik et al. |
| 2019/0238449 | A1 | 8/2019 | Michael et al. |
| 2019/0238450 | A1 | 8/2019 | Michael et al. |
| 2019/0238483 | A1 | 8/2019 | Marichetty et al. |
| 2019/0238497 | A1 | 8/2019 | Tourrilhes et al. |
| 2019/0268421 | A1 | 8/2019 | Markuze et al. |
| 2019/0268973 | A1 | 8/2019 | Bull et al. |
| 2019/0278631 | A1 | 9/2019 | Bernat et al. |
| 2019/0280962 | A1 | 9/2019 | Michael et al. |
| 2019/0280963 | A1 | 9/2019 | Michael et al. |
| 2019/0280964 | A1 | 9/2019 | Michael et al. |
| 2019/0288875 | A1 | 9/2019 | Shen et al. |
| 2019/0306197 | A1 | 10/2019 | Degioanni |
| 2019/0306282 | A1 | 10/2019 | Masputra et al. |
| 2019/0313278 | A1 | 10/2019 | Liu |
| 2019/0313907 | A1 | 10/2019 | Khachaturian et al. |
| 2019/0319847 | A1 | 10/2019 | Nahar et al. |
| 2019/0319881 | A1 | 10/2019 | Maskara et al. |
| 2019/0327109 | A1 | 10/2019 | Guichard et al. |
| 2019/0334786 | A1 | 10/2019 | Dutta et al. |
| 2019/0334813 | A1 | 10/2019 | Raj et al. |
| 2019/0334820 | A1 | 10/2019 | Zhao |
| 2019/0342201 | A1 | 11/2019 | Singh |
| 2019/0342219 | A1 | 11/2019 | Liu et al. |
| 2019/0356736 | A1 | 11/2019 | Narayanaswamy et al. |
| 2019/0364099 | A1 | 11/2019 | Thakkar et al. |
| 2019/0364456 | A1 | 11/2019 | Yu |
| 2019/0372888 | A1 | 12/2019 | Michael et al. |
| 2019/0372889 | A1 | 12/2019 | Michael et al. |
| 2019/0372890 | A1 | 12/2019 | Michael et al. |
| 2019/0394081 | A1 | 12/2019 | Tahhan et al. |
| 2020/0014609 | A1 | 1/2020 | Hockett et al. |
| 2020/0014615 | A1 | 1/2020 | Michael et al. |
| 2020/0014616 | A1 | 1/2020 | Michael et al. |
| 2020/0014661 | A1 | 1/2020 | Mayya et al. |
| 2020/0014663 | A1 | 1/2020 | Chen et al. |
| 2020/0021514 | A1 | 1/2020 | Michael et al. |
| 2020/0021515 | A1 | 1/2020 | Michael et al. |
| 2020/0036624 | A1 | 1/2020 | Michael et al. |
| 2020/0044943 | A1 | 2/2020 | Bor-Yaliniz et al. |
| 2020/0044969 | A1 | 2/2020 | Hao et al. |
| 2020/0059420 | A1 | 2/2020 | Abraham |
| 2020/0059457 | A1 | 2/2020 | Raza et al. |
| 2020/0059459 | A1 | 2/2020 | Abraham et al. |
| 2020/0067831 | A1 | 2/2020 | Spraggins et al. |
| 2020/0092207 | A1 | 3/2020 | Sipra et al. |
| 2020/0097327 | A1 | 3/2020 | Beyer et al. |
| 2020/0099625 | A1 | 3/2020 | Mgit et al. |
| 2020/0099659 | A1 | 3/2020 | Cometto et al. |
| 2020/0106696 | A1 | 4/2020 | Michael et al. |
| 2020/0106706 | A1 | 4/2020 | Mayya et al. |
| 2020/0119952 | A1 | 4/2020 | Mayya et al. |
| 2020/0127905 | A1 | 4/2020 | Mayya et al. |
| 2020/0127911 | A1 | 4/2020 | Gilson et al. |
| 2020/0153701 | A1 | 5/2020 | Mohan et al. |
| 2020/0153736 | A1 | 5/2020 | Liebherr et al. |
| 2020/0159661 | A1 | 5/2020 | Keymolen et al. |
| 2020/0162407 | A1 | 5/2020 | Tillotson |
| 2020/0169473 | A1 | 5/2020 | Rimar et al. |
| 2020/0177503 | A1 | 6/2020 | Hooda et al. |
| 2020/0177550 | A1 | 6/2020 | Valluri et al. |
| 2020/0177629 | A1 | 6/2020 | Hooda et al. |
| 2020/0186471 | A1 | 6/2020 | Shen et al. |
| 2020/0195557 | A1 | 6/2020 | Duan et al. |
| 2020/0204460 | A1 | 6/2020 | Schneider et al. |
| 2020/0213212 | A1 | 7/2020 | Dillon et al. |
| 2020/0213224 | A1 | 7/2020 | Cheng et al. |
| 2020/0218558 | A1 | 7/2020 | Sreenath et al. |
| 2020/0235990 | A1 | 7/2020 | Janakiraman et al. |
| 2020/0235999 | A1 | 7/2020 | Mayya et al. |
| 2020/0236046 | A1 | 7/2020 | Jain et al. |
| 2020/0241927 | A1 | 7/2020 | Yang et al. |
| 2020/0244721 | A1 | 7/2020 | S et al. |
| 2020/0252234 | A1 | 8/2020 | Ramamoorthi et al. |
| 2020/0252324 | A1 | 8/2020 | Charles et al. |
| 2020/0259700 | A1 | 8/2020 | Bhalla et al. |
| 2020/0267184 | A1 | 8/2020 | Vera-Schockner |
| 2020/0267203 | A1 | 8/2020 | Jindal et al. |
| 2020/0280587 | A1 | 9/2020 | Janakiraman et al. |
| 2020/0287819 | A1 | 9/2020 | Theogaraj et al. |
| 2020/0287976 | A1 | 9/2020 | Theogaraj et al. |
| 2020/0296011 | A1 | 9/2020 | Jain et al. |
| 2020/0296026 | A1 | 9/2020 | Michael et al. |
| 2020/0301764 | A1 | 9/2020 | Thoresen et al. |

(56) References Cited

U.S. PATENT DOCUMENTS

2020/0314006 A1 10/2020 Mackie et al.
2020/0314614 A1 10/2020 Moustafa et al.
2020/0322230 A1 10/2020 Natal et al.
2020/0322287 A1 10/2020 Connor et al.
2020/0336336 A1 10/2020 Sethi et al.
2020/0344089 A1 10/2020 Motwani et al.
2020/0344143 A1 10/2020 Faseela et al.
2020/0344163 A1 10/2020 Gupta et al.
2020/0351188 A1 11/2020 Arora et al.
2020/0358878 A1 11/2020 Bansal et al.
2020/0366530 A1 11/2020 Mukundan et al.
2020/0366562 A1 11/2020 Mayya et al.
2020/0382345 A1 12/2020 Zhao et al.
2020/0382387 A1 12/2020 Pasupathy et al.
2020/0403821 A1 12/2020 Dev et al.
2020/0412483 A1 12/2020 Tan et al.
2020/0412576 A1 12/2020 Kondapavuluru et al.
2020/0413283 A1 12/2020 Shen et al.
2021/0006482 A1 1/2021 Hwang et al.
2021/0006490 A1 1/2021 Michael et al.
2021/0021538 A1 1/2021 Meck et al.
2021/0029019 A1 1/2021 Kottapalli
2021/0029088 A1 1/2021 Mayya et al.
2021/0036888 A1 2/2021 Makkalla et al.
2021/0036987 A1 2/2021 Mishra et al.
2021/0037159 A1 2/2021 Shimokawa
2021/0049191 A1 2/2021 Masson et al.
2021/0067372 A1 3/2021 Cidon et al.
2021/0067373 A1 3/2021 Cidon et al.
2021/0067374 A1 3/2021 Cidon et al.
2021/0067375 A1 3/2021 Cidon et al.
2021/0067407 A1 3/2021 Cidon et al.
2021/0067427 A1 3/2021 Cidon et al.
2021/0067442 A1 3/2021 Sundararajan et al.
2021/0067461 A1 3/2021 Cidon et al.
2021/0067464 A1 3/2021 Cidon et al.
2021/0067467 A1 3/2021 Cidon et al.
2021/0067468 A1 3/2021 Cidon et al.
2021/0073001 A1 3/2021 Rogers et al.
2021/0092062 A1 3/2021 Dhanabalan et al.
2021/0099360 A1 4/2021 Parsons et al.
2021/0105199 A1 4/2021 C H et al.
2021/0111998 A1 4/2021 Saavedra
2021/0112034 A1 4/2021 Sundararajan et al.
2021/0126830 A1 4/2021 R. et al.
2021/0126853 A1 4/2021 Ramaswamy et al.
2021/0126854 A1 4/2021 Guo et al.
2021/0126860 A1 4/2021 Ramaswamy et al.
2021/0144091 A1 5/2021 C H et al.
2021/0160169 A1 5/2021 Shen et al.
2021/0160813 A1 5/2021 Gupta et al.
2021/0176255 A1 6/2021 Hill et al.
2021/0184952 A1 6/2021 Mayya et al.
2021/0184966 A1 6/2021 Ramaswamy et al.
2021/0184983 A1 6/2021 Ramaswamy et al.
2021/0194814 A1 6/2021 Roux et al.
2021/0226880 A1 7/2021 Ramamoorthy et al.
2021/0234728 A1 7/2021 Cidon et al.
2021/0234775 A1 7/2021 Devadoss et al.
2021/0234786 A1 7/2021 Devadoss et al.
2021/0234804 A1 7/2021 Devadoss et al.
2021/0234805 A1 7/2021 Devadoss et al.
2021/0235312 A1 7/2021 Devadoss et al.
2021/0235313 A1 7/2021 Devadoss et al.
2021/0266262 A1 8/2021 Subramanian et al.
2021/0279069 A1 9/2021 Salgaonkar et al.
2021/0314289 A1 10/2021 Chandrashekhar et al.
2021/0314385 A1 10/2021 Pande et al.
2021/0328835 A1 10/2021 Mayya et al.
2021/0336880 A1 10/2021 Gupta et al.
2021/0377109 A1 12/2021 Shrivastava et al.
2021/0377156 A1 12/2021 Michael et al.
2021/0392060 A1 12/2021 Silva et al.
2021/0392070 A1 12/2021 Tootaghaj et al.
2021/0392171 A1 12/2021 Srinivas et al.
2021/0392477 A1 12/2021 Taft et al.
2021/0399920 A1 12/2021 Sundararajan et al.
2021/0399978 A9 12/2021 Michael et al.
2021/0400113 A1 12/2021 Markuze et al.
2021/0400512 A1 12/2021 Agarwal et al.
2021/0409277 A1 12/2021 Jeuk et al.
2022/0006726 A1 1/2022 Michael et al.
2022/0006751 A1 1/2022 Ramaswamy et al.
2022/0006756 A1 1/2022 Ramaswamy et al.
2022/0029902 A1 1/2022 Shemer et al.
2022/0035673 A1 2/2022 Markuze et al.
2022/0038370 A1 2/2022 Vasseur et al.
2022/0038557 A1 2/2022 Markuze et al.
2022/0045927 A1 2/2022 Liu et al.
2022/0052928 A1 2/2022 Sundararajan et al.
2022/0061059 A1 2/2022 Dunsmore et al.
2022/0086035 A1 3/2022 Devaraj et al.
2022/0094644 A1 3/2022 Cidon et al.
2022/0123961 A1 4/2022 Mukundan et al.
2022/0131740 A1 4/2022 Mayya et al.
2022/0131807 A1 4/2022 Srinivas et al.
2022/0131898 A1 4/2022 Hooda et al.
2022/0141184 A1 5/2022 Oswal et al.
2022/0158923 A1 5/2022 Ramaswamy et al.
2022/0158924 A1 5/2022 Ramaswamy et al.
2022/0158926 A1 5/2022 Wennerström et al.
2022/0166713 A1 5/2022 Markuze et al.
2022/0191719 A1 6/2022 Roy
2022/0198229 A1 6/2022 López et al.
2022/0210035 A1 6/2022 Hendrickson et al.
2022/0210041 A1 6/2022 Gandhi et al.
2022/0210042 A1 6/2022 Gandhi et al.
2022/0210122 A1 6/2022 Levin et al.
2022/0217015 A1 7/2022 Vuggrala et al.
2022/0231949 A1 7/2022 Ramaswamy et al.
2022/0231950 A1 7/2022 Ramaswamy et al.
2022/0232411 A1 7/2022 Vijayakumar et al.
2022/0239596 A1 7/2022 Kumar et al.
2022/0335027 A1 10/2022 Seshadri et al.
2022/0337553 A1 10/2022 Mayya et al.
2022/0353152 A1 11/2022 Ramaswamy
2022/0353171 A1 11/2022 Ramaswamy et al.
2022/0353175 A1 11/2022 Ramaswamy et al.
2022/0353182 A1 11/2022 Ramaswamy et al.
2022/0353190 A1 11/2022 Ramaswamy et al.
2022/0360500 A1 11/2022 Ramaswamy et al.
2022/0407773 A1 12/2022 Kempanna et al.
2022/0407774 A1 12/2022 Kempanna et al.
2022/0407790 A1 12/2022 Kempanna et al.
2022/0407820 A1 12/2022 Kempanna et al.
2022/0407915 A1 12/2022 Kempanna et al.
2023/0006929 A1 1/2023 Mayya et al.
2023/0025586 A1 1/2023 Rolando et al.
2023/0026330 A1 1/2023 Rolando et al.
2023/0026865 A1 1/2023 Rolando et al.
2023/0028872 A1 1/2023 Ramaswamy
2023/0039869 A1 2/2023 Ramaswamy et al.
2023/0041916 A1 2/2023 Zhang et al.
2023/0054961 A1 2/2023 Ramaswamy et al.
2023/0105680 A1 4/2023 Simlai et al.
2023/0121871 A1 4/2023 Mayya et al.
2023/0164158 A1 5/2023 Fellows et al.
2023/0179445 A1 6/2023 Cidon et al.
2023/0179502 A1 6/2023 Ramaswamy et al.
2023/0179521 A1 6/2023 Markuze et al.
2023/0179543 A1 6/2023 Cidon et al.
2023/0216768 A1 7/2023 Zohar et al.
2023/0216801 A1 7/2023 Markuze et al.
2023/0216804 A1 7/2023 Zohar et al.
2023/0221874 A1 7/2023 Markuze et al.
2023/0224356 A1 7/2023 Markuze et al.
2023/0224759 A1 7/2023 Ramaswamy
2023/0231845 A1 7/2023 Manoharan et al.
2023/0239234 A1 7/2023 Zohar et al.

(56) References Cited

U.S. PATENT DOCUMENTS

| | | | |
|---|---|---|---|
| 2023/0261974 | A1 | 8/2023 | Ramaswamy et al. |
| 2023/0308421 | A1 | 9/2023 | Mayya et al. |

FOREIGN PATENT DOCUMENTS

| | | | |
|---|---|---|---|
| CN | 102577270 | A | 7/2012 |
| CN | 102811165 | A | 12/2012 |
| CN | 104205757 | A | 12/2014 |
| CN | 104956329 | A | 9/2015 |
| CN | 106230650 | A | 12/2016 |
| CN | 106656847 | A | 5/2017 |
| CN | 106998284 | A | 8/2017 |
| CN | 110447209 | A | 11/2019 |
| CN | 111198764 | A | 5/2020 |
| EP | 1031224 | B1 | 3/2005 |
| EP | 1912381 | A1 | 4/2008 |
| EP | 2538637 | A2 | 12/2012 |
| EP | 2763362 | A1 | 8/2014 |
| EP | 3041178 | A1 | 7/2016 |
| EP | 3297211 | A1 | 3/2018 |
| EP | 3509256 | A1 | 7/2019 |
| EP | 3346650 | B1 | 11/2019 |
| JP | 2002368792 | A | 12/2002 |
| JP | 2010233126 | A | 10/2010 |
| JP | 2014200010 | A | 10/2014 |
| JP | 2017059991 | A | 3/2017 |
| JP | 2017524290 | A | 8/2017 |
| KR | 20170058201 | A | 5/2017 |
| RU | 2574350 | C2 | 2/2016 |
| WO | 2000078004 | A2 | 12/2000 |
| WO | 03073701 | A1 | 9/2003 |
| WO | 2005071861 | A1 | 8/2005 |
| WO | 2007016834 | A1 | 2/2007 |
| WO | 2012167184 | A2 | 12/2012 |
| WO | 2015092565 | A1 | 6/2015 |
| WO | 2016061546 | A1 | 4/2016 |
| WO | 2016123314 | A1 | 8/2016 |
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2020214173 | A1 | 10/2020 |
| WO | 2021040934 | A1 | 3/2021 |
| WO | 2021118717 | A1 | 6/2021 |
| WO | 2021150465 | A1 | 7/2021 |
| WO | 2021211906 | A1 | 10/2021 |
| WO | 2021242562 | A1 | 12/2021 |
| WO | 2022005607 | A1 | 1/2022 |
| WO | 2022082680 | A1 | 4/2022 |
| WO | 2022154850 | A1 | 7/2022 |
| WO | 2022159156 | A1 | 7/2022 |
| WO | 2022231668 | A1 | 11/2022 |
| WO | 2022235303 | A1 | 11/2022 |
| WO | 2022265681 | A1 | 12/2022 |
| WO | 2023009159 | A1 | 2/2023 |

OTHER PUBLICATIONS

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (Mascots), Sep. 19-21, 2016, 10 pages, IEEE, London, UK.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Petition for Post-Grant Review of U.S. Pat. No. 9,722,815, filed May 1, 2018, 106 pages.

(56) References Cited

OTHER PUBLICATIONS

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.
Non-Published Commonly Owned U.S. Appl. No. 18/197,090, filed May 14, 2023, 36 pages, Nicira, Inc.
Author Unknown, "VeloCloud Administration Guide: VMware SD-WAN by VeloCloud 3.3," Month Unknown 2019, 366 pages, VMware, Inc., Palo Alto, CA, USA.
Non-Published Commonly Owned U.S. Appl. No. 17/850,112, filed Jun. 27, 2022, 41 pages, Nicira, Inc.
Non-Published Commonly Owned U.S. Appl. No. 17/943,147, filed Sep. 12, 2022, 42 pages, Nicira, Inc.
Non-Published Commonly Owned U.S. Appl. No. 18/083,536, filed Dec. 18, 2022, 27 pages, VMware, Inc.
Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

METHOD AND SYSTEM OF CONNECTING TO A MULTIPATH HUB IN A CLUSTER

CROSS REFERENCE TO RELATED APPLICATIONS

This application is a continuation application of U.S. patent application Ser. No. 17/827,972, filed May 30, 2022. U.S. patent application Ser. No. 17/827,972 is a continuation application of U.S. patent application Ser. No. 16/945,867, filed Aug. 1, 2020, now issued as U.S. Pat. No. 11,349,722. U.S. patent application Ser. No. 16/945,867 is a continuation application of U.S. patent application Ser. No. 15/707,124, filed Sep. 18, 2017, now issued as U.S. Pat. No. 10,778,528. U.S. patent application Ser. No. 15/707,124 claims priority to U.S. Provisional Patent Application No. 62/457,816, titled METHOD AND SYSTEM OF OVERLAY FLOW CONTROL, filed on Feb. 11, 2017. U.S. patent application Ser. No. 15/707,124 claims priority to U.S. Provisional Patent Application No. 62/523,477, titled METHOD AND SYSTEM OF RESILIENCY AND VISIBILITY IN CLOUD-DELIVERED SD-WAN, filed on Jun. 22, 2017. All of these applications and patents are incorporated herein by reference in their entireties for all purposes.

FIELD OF THE INVENTION

This application relates generally to computer networking, and more specifically to a system, article of manufacture and method connecting to a hub in a cluster.

DESCRIPTION OF THE RELATED ART

Inherently, the size of a single VPN Network with a Hub may be constrained by the scale of the individual Hub. For large customers whose deployments reach twenty-thousand (20,000) sites, it may neither practical to scale an individual appliance to meet this scale nor mandate the customer manage individual separate Hubs to achieve this. In order to address this limitation, a clustering functionality can be used to easily expand the capacity of the Hub dynamically by creating a logical cluster, while also providing resiliency via the Active/Active HA topology that a cluster of Edges would provide. The Nodes in a Cluster can be either physical or virtual Edges. If they are virtual; they may exist on a single hypervisor or across hypervisors. The Edges within the cluster may communicate with the Gateway for control plane information and do not directly communicate nor exchange state.

BRIEF SUMMARY OF THE INVENTION

In one aspect, a computerized method useful for connecting to a multipath hub in a cluster includes the step of, with a gateway in a same network as the cluster, receiving, from a branch edge, a request to connect to a logical Identifier (ID) of the multipath hub. The gateway recognizes a logical ID representing a cluster. The gateway determines a least-loaded edge in the cluster to be the multipath hub. The gateway returns a connectivity information for the multipath hub. The branch edge configures a tunnel to the multipath hub.

Figure 1:
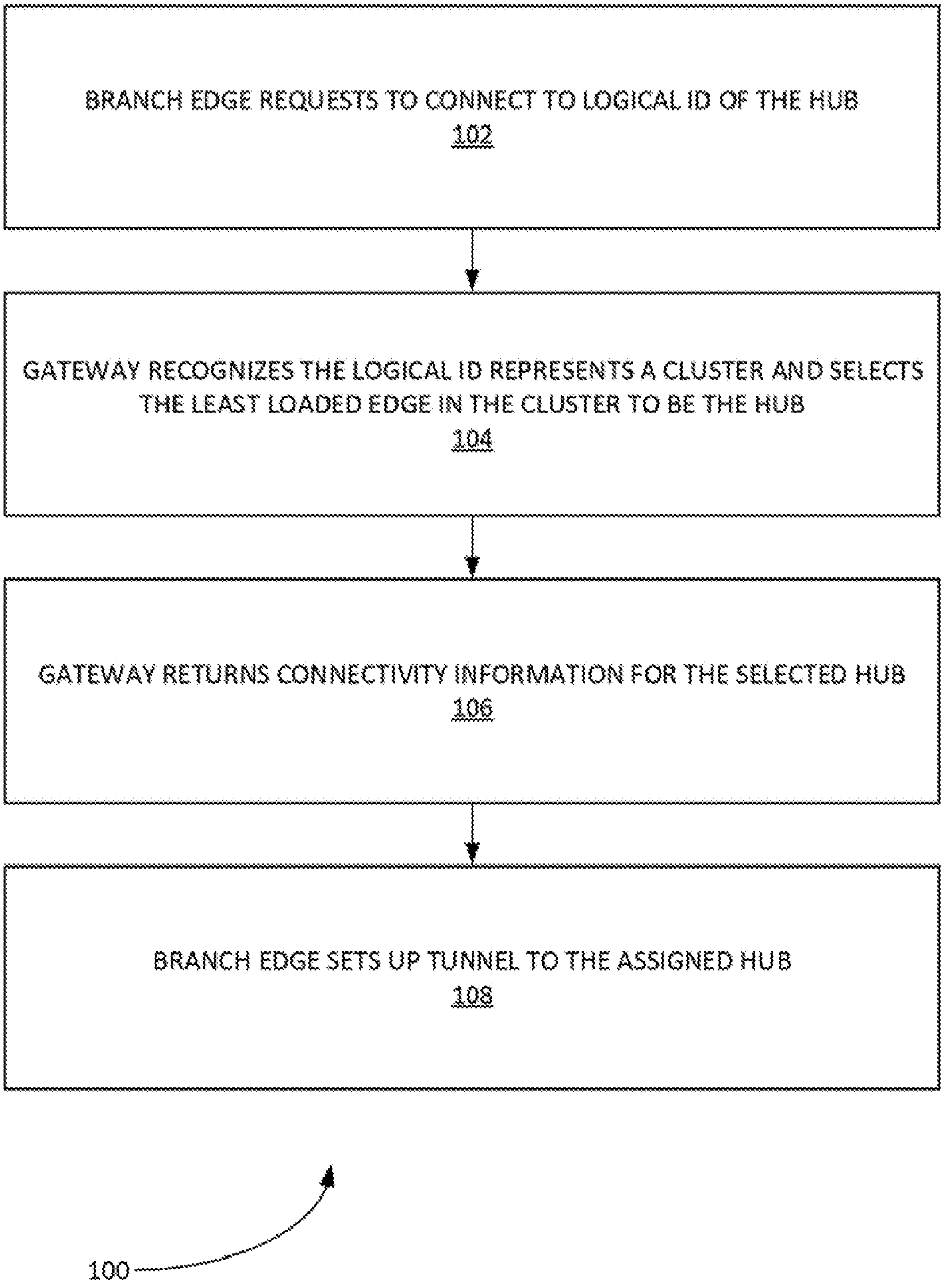
FIG. 1 illustrates an example process for connecting to a hub in a cluster, according to some embodiments.

The Figures described above are a representative set, and are not exhaustive with respect to embodying the invention.

DESCRIPTION

Disclosed are a system, method, and article of manufacture for connecting to a multipath hub in a cluster. The following description is presented to enable a person of ordinary skill In the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to “one embodiment,” “an embodiment,” ‘one example,’ or similar language means that a particular feature, structure, or characteristic described in connection with the embodiment is included in at least one embodiment of the present invention. Thus, appearances of the phrases “in one embodiment,” “in an embodiment,” and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Border Gateway Protocol (BGP) can be a standardized exterior gateway protocol designed to exchange routing and reachability information among autonomous systems (AS) on the Internet.

Dynamic tunneling can refer to Multi Path tunnels (i.e. paths) that are established on-demand between two endpoints when there is VPN traffic to be sent between two Edges, and torn down after VPN traffic is completed.

Edge device can be a device that provides an entry point into enterprise or service provider core networks. An edge device can be software running in a virtual machine (VM) located in a branch office and/or customer premises.

Enterprise Data Center can include multiple data centers (e.g. each with a duty of sustaining key functions).

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Inter-process communication (IPC) can include mechanisms an operating system provides to allow the processes to manage shared data. Typically, applications can use IPC, categorized as clients and servers, where the client requests data and the server responds to client requests.

Orchestrator can include a software component that provides multi-tenant and role based centralized configuration management and visibility.

Subnet can be a logical subdivision of an IP network.

Tunneling protocol can allow a network user to access or provide a network service that the underlying network does not support or provide directly.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Additional example definitions are provided herein.

EXAMPLES SYSTEMS AND PROCESSES

A variety of techniques can be used to maintain branch connectivity to data centers, cloud applications, etc. For example, in a data center topology, an edge device (e.g. an edge) can be deployed in two different ways. As a cluster, redundancy can be provided for a single data center leveraging multiple independent devices. Alternately, redundancy can be provided by deploying multiple physical edges in multiple data centers that are interconnected via routing external to a gateway. In the clustering topology, each edge in a cluster can report health statistics to a gateway at a specified period (e.g. every 30 seconds, etc.). This can enable it to make intelligent decisions about assignment and rebalancing.

FIG. 1 illustrates an example process 100 for connecting to a multipath hub in a cluster, according to some embodiments. In step 102, a branch edge can request to connect to logical identifier (ID) of the multipath hub (e.g. a node with a large number of links, etc.). In step 104, the gateway recognizes the logical ID represents a cluster and selects the least loaded edge the cluster to be the multipath hub. In step 106, the gateway returns connectivity information for the selected multipath hub. In step 108, the branch edge sets up tunnel to the assigned multipath hub. Each measure of utilization is treated as a max out of one-hundred percent (100%). The tunnel count can be a maximum value based on the model number of the hardware model itself. The three (3) utilization percentages can be averaged to arrive at an integer number of utilization. The Edge with the lowest utilization number can be selected as the multipath hub. In case of a tie in lowest utilization score, a first Edge in the list with that score (e.g. the Edge which has been connected to the gateway the longest) can be selected. For example, on an Edge 1000: CPU 20%, Memory 30%, Tunnels 200 (out of 2000 max) Utilization score: (20+30+(20/2000))/3=20.

Figure 2:
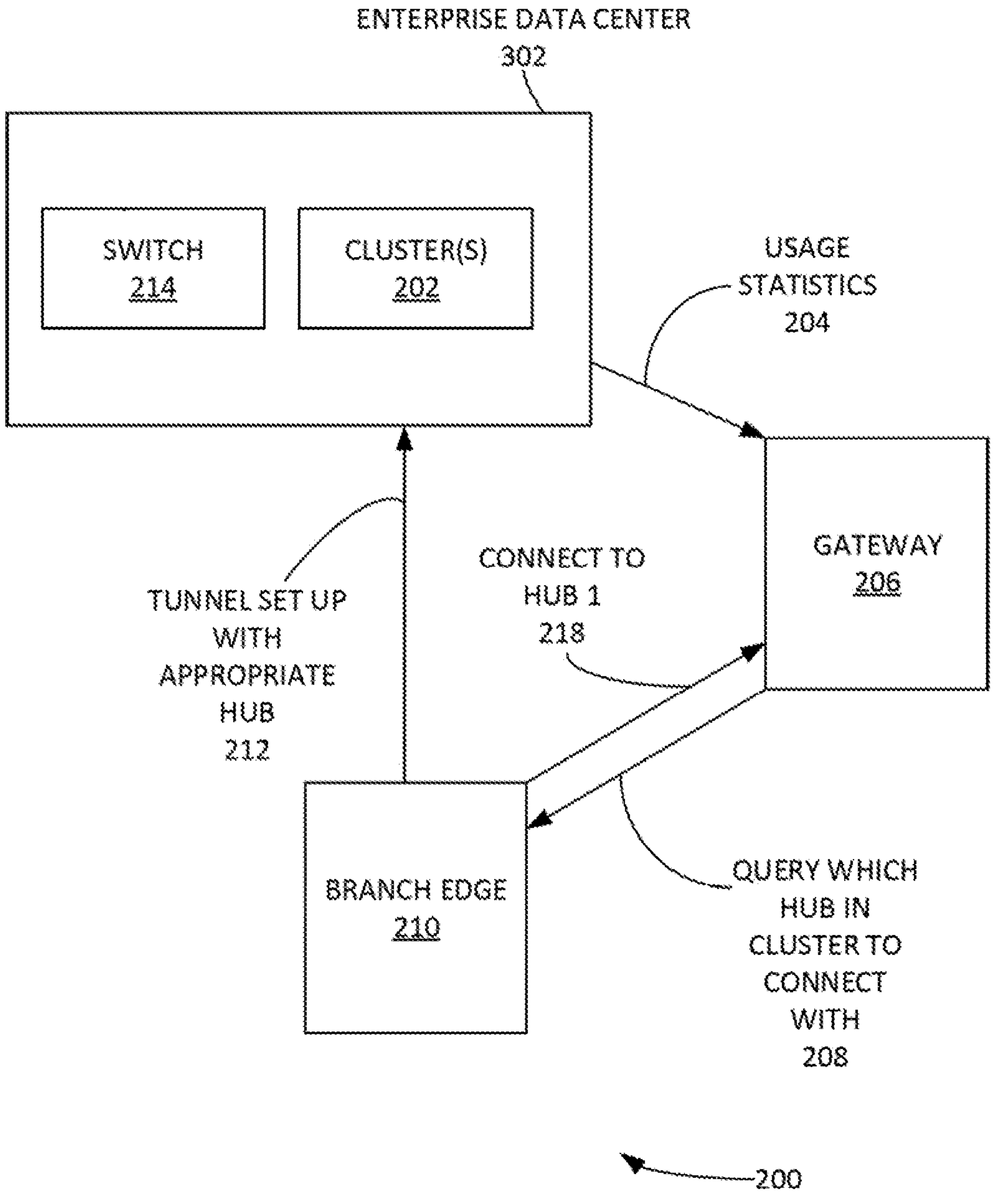
FIG. 2 illustrates a system for implementing process 100, according to some embodiments.
Figure 3:
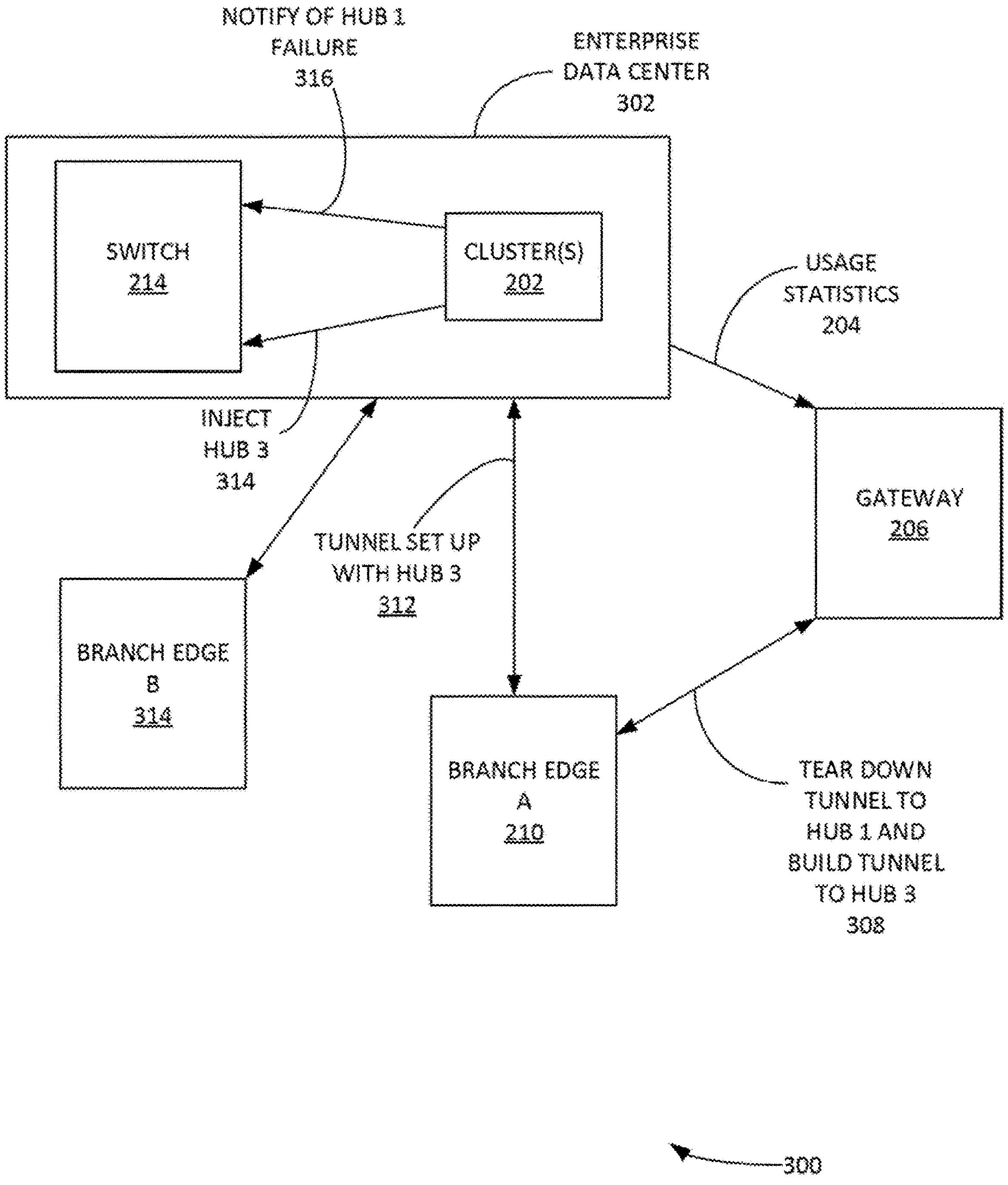
FIG. 3 illustrates an example when a Branch Edge loses connectivity to a Hub of an Enterprise Data Center, according to some embodiments.

FIGS. 2 and 3 illustrate systems 200 and 300 for implementing process 100, according to some embodiments. Cluster(s) 202 can include various multipath hubs (e.g. Hubs 1-4 502-508 of FIG. 5, etc.). Cluster(s) 202 can communicate various network usage statistics 204 to cluster 206. Cluster(s) 202 can operate in an Enterprise Data Center 302. Branch Edge 210 can communicate a query which hub in cluster to connect with to cluster 206. Cluster 206 can communicate a specific hub identifier to Branch Edge 210 in step 214. Based on this information, branch edge 210 can set up a tunnel with appropriate hub in step 212. Switch 214 can be an L3 switch. Layer 3 switching can be based on (e.g. destination) IP address stored in the header of IP datagram.

FIG. 3 illustrates an example when a Stanch Edge 210 loses connectivity to a multipath Hub of an Enterprise Data Center, according to some embodiments. For example, all tunnels/paths connecting the Edge to the Hub disconnect and the Edge loses all means of connectivity to the Hub. It can again send a connection request to a gateway with the logical ID of Gateway 206, as if it were connecting for the first time. Since the gateway also has a list of connected hubs, if there was truly an outage, it may have also gone dead to the gateway and have been deleted from the list of available Edges that can be assigned from Gateway 206.

Even though in this use case Branch Edge(s) 210 and 314 may be connected to different Hubs in Gateway 206. Gateway 206 can signal the creation of Dynamic Edge-to-Edge tunnels in case both Branch Edge(s) 210 and 314 are not connected to the same Hub in Gateway 206. Gateway 206 can include a controller (not shown) that functions as a control plane piece of the Gateway 206.

Figure 4:
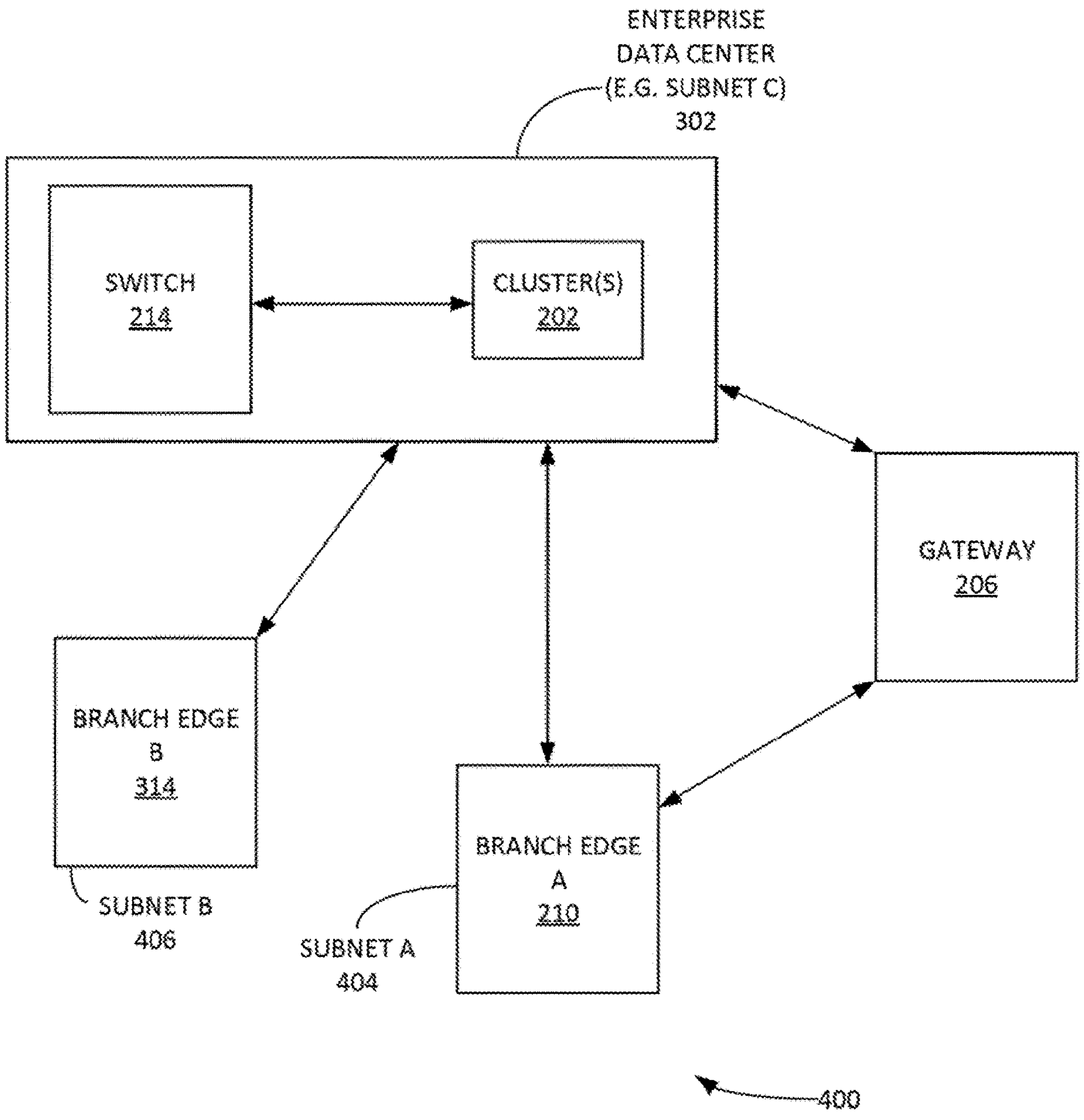
FIG. 4 where an Edge A sends traffic from Subnet A to Subnet B, according to some embodiments.

FIG. 4 where an Edge A 210 sends traffic from Subnet A 404 to Subnet B 406, according to some embodiments, Edge A 210 can send traffic from Subnet A 404 to Subnet B 406. Hub1 has learned the route for Edge B 314 from the L3 Switch 214 and advertised to Edge A 210 via a routing protocol (e.g. Velocloud® routing protocol (VCRP), etc.), Edge1 sends the traffic to Hub1. Edge1 can notify the gateway that it has initiated a connection to an IP in B.

Traffic for B can be forwarded to the L3 Switch 214. L3 Switch 214 routes traffic to Hub3 as switch 214 has learned that route from Hub3 via a dynamic routing protocol (e.g. OSPF, BGP, etc.). Hub3 sends the traffic to Edge B 314 where it has learned the route for Edge B 314 via a routing protocol. Upon receipt of the message sent in process 100 supra, the gateway determines that Edge A 210 and Edge B 314 can directly connect. The gateway can notify Edge A 210 about connectivity information of Edge B 314. Gateway notifies Edge B 314 about connectivity information of Edge A 210. A dynamic tunnel can be established between Edge A 210 and Edge B 314. Traffic is moved to the direct tunnel and no longer traverses Cluster 206. It is noted that Cluster(s) 202 can operate in an Enterprise Data Center 302 (e.g. Subnet C).

Figure 5:
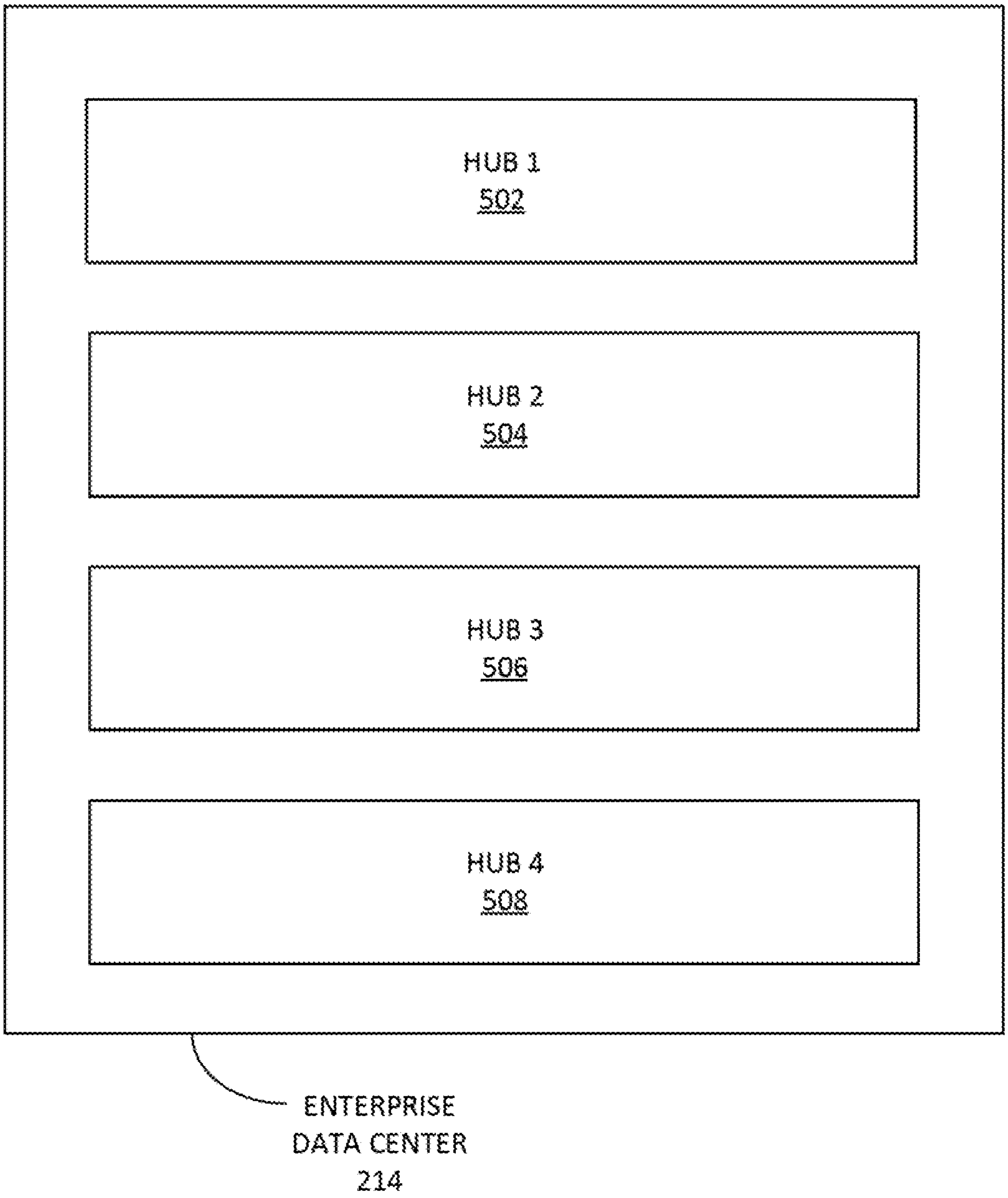
FIG. 5 illustrates an example enterprise data center, according to some embodiments.

FIG. 5 illustrates an example enterprise data center, according to some embodiments. By way of example, Enterprise data center 202 cart include one or more Hubs 1-4 502-508.

Figure 6:
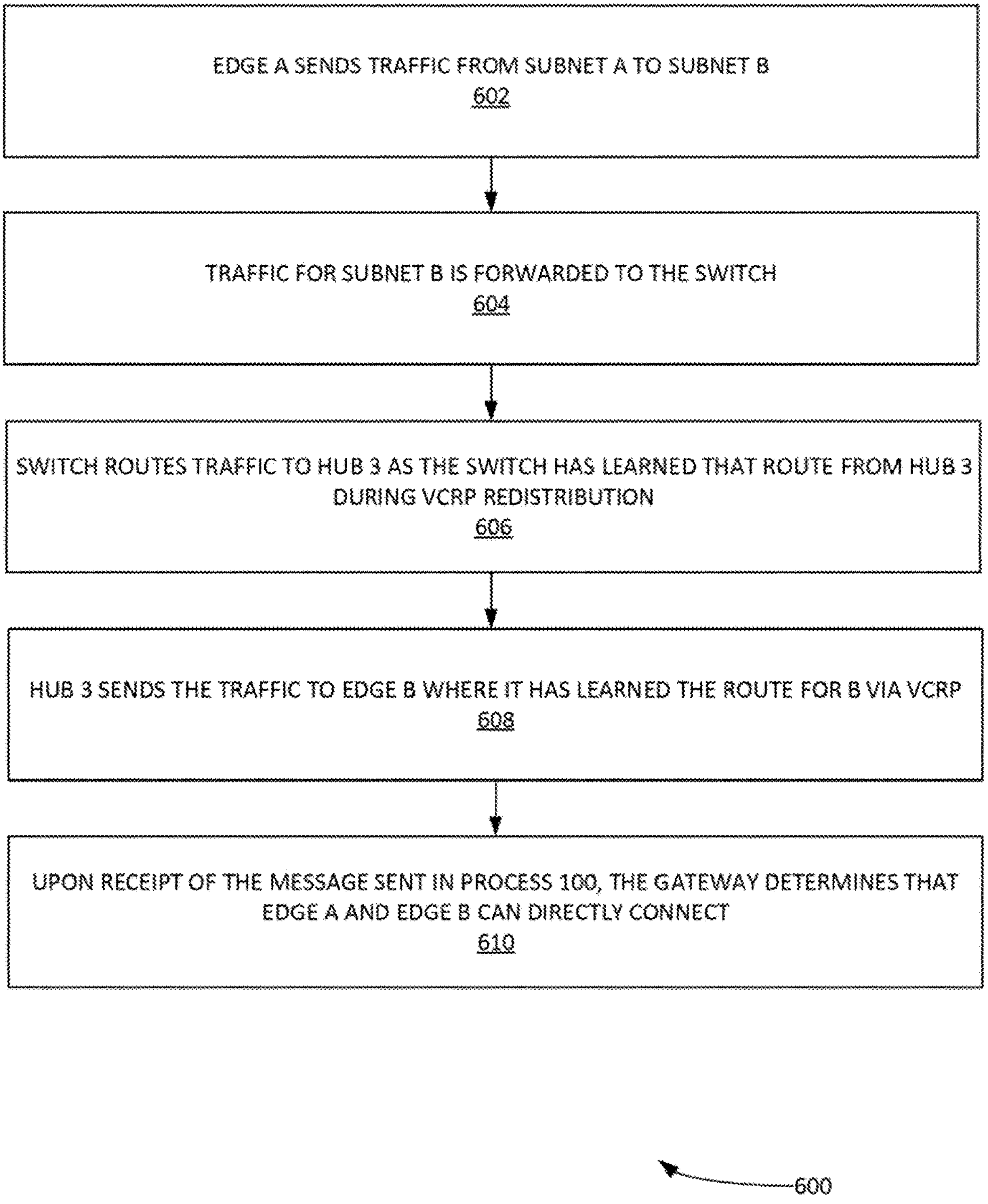
FIG. 6 illustrates an example process for connecting when an edge loses connectivity to a hub, according to some embodiments.

FIG. 6 illustrates an example process 600 for connecting when an edge loses connectivity to a hub, according to some embodiments. Process 600 can be implement with system 400 of FIG. 4 and system 500 of FIG. 5. For example, in step 602, Edge A 210 sends traffic from Subnet A 404 to Subnet B 406.

Figure 7:
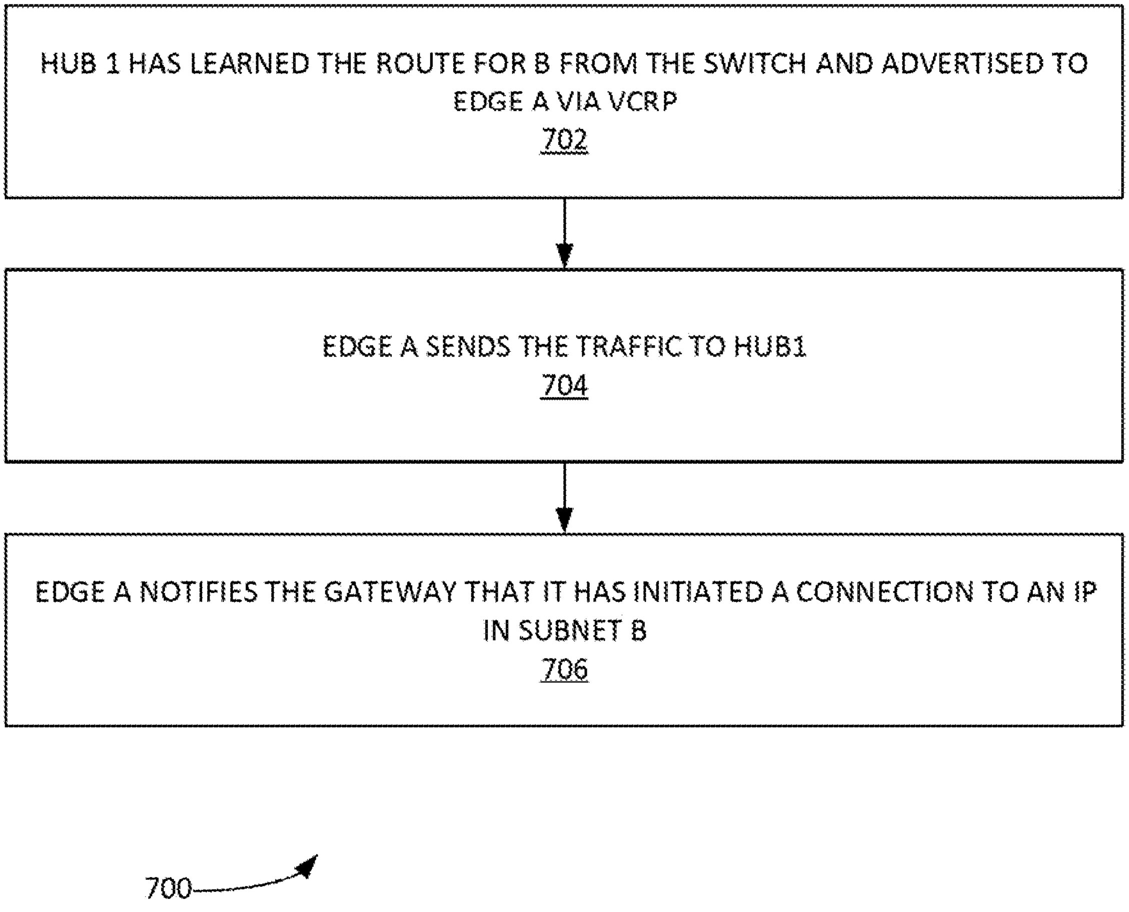
FIG. 7 illustrates an example process of implementing aspects of step 602 or process 600, according to some embodiments.

FIG. 7 illustrates an example process 700 of implementing aspects of step 602 or process 600, according to some embodiments. In step 702, Hub 1 502 has learned the route for Edge B 314 from the switch and advertised to Edge A 210 via a routing protocol. In step 704, Edge A 210 sends the traffic to Hub1 502. In step 706, Edge A 210 notifies the gateway that it has initiated a connection to an IP in Subnet B 406.

Returning to process 600, in step 604, traffic for Subnet B 406 is forwarded to the Switch 214. In step 606, the switch routes traffic to Hub 3 506 as the switch has learned that route from Hub 3 506 via a dynamic routing protocol (e.g. OSPF, BGP, etc.). In step 608, Hub 3 506 sends the traffic to Edge B where it has learned the route for B via a routing protocol.

Figure 8:
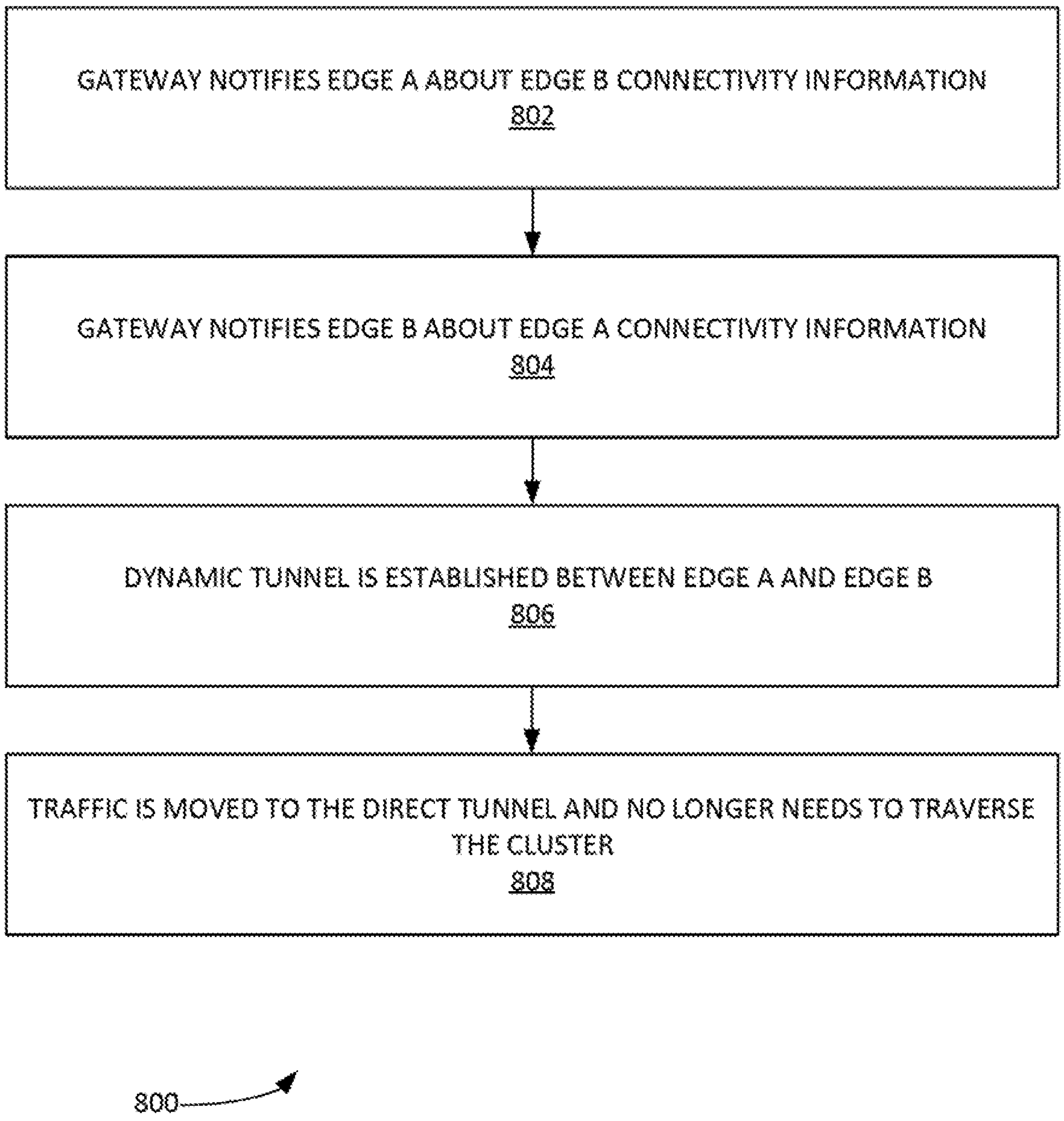
FIG. 8 illustrates an example process for implementing aspects of step 610 and/or process 600, according to some embodiments.

In step 610, upon receipt of the message sent in process 100, the gateway determines that Edge A 210 and Edge B 314 can directly connect. Edge A 210 and Edge B 314 are then connected. FIG. 8 illustrates an example process 800 for implementing aspects of step 610 and/or process 600, according to some embodiments. In step 802, a gateway notifies Edge A 210 about Edge B 314 connectivity information. In step 804, the gateway notifies Edge B 314 about the connectivity information of Edge A 210. In step 806, a dynamic tunnel is established between edge a and Edge B 314. In step 808, traffic is moved to the direct tunnel and no longer needs to traverse cluster 206.

Figure 9:
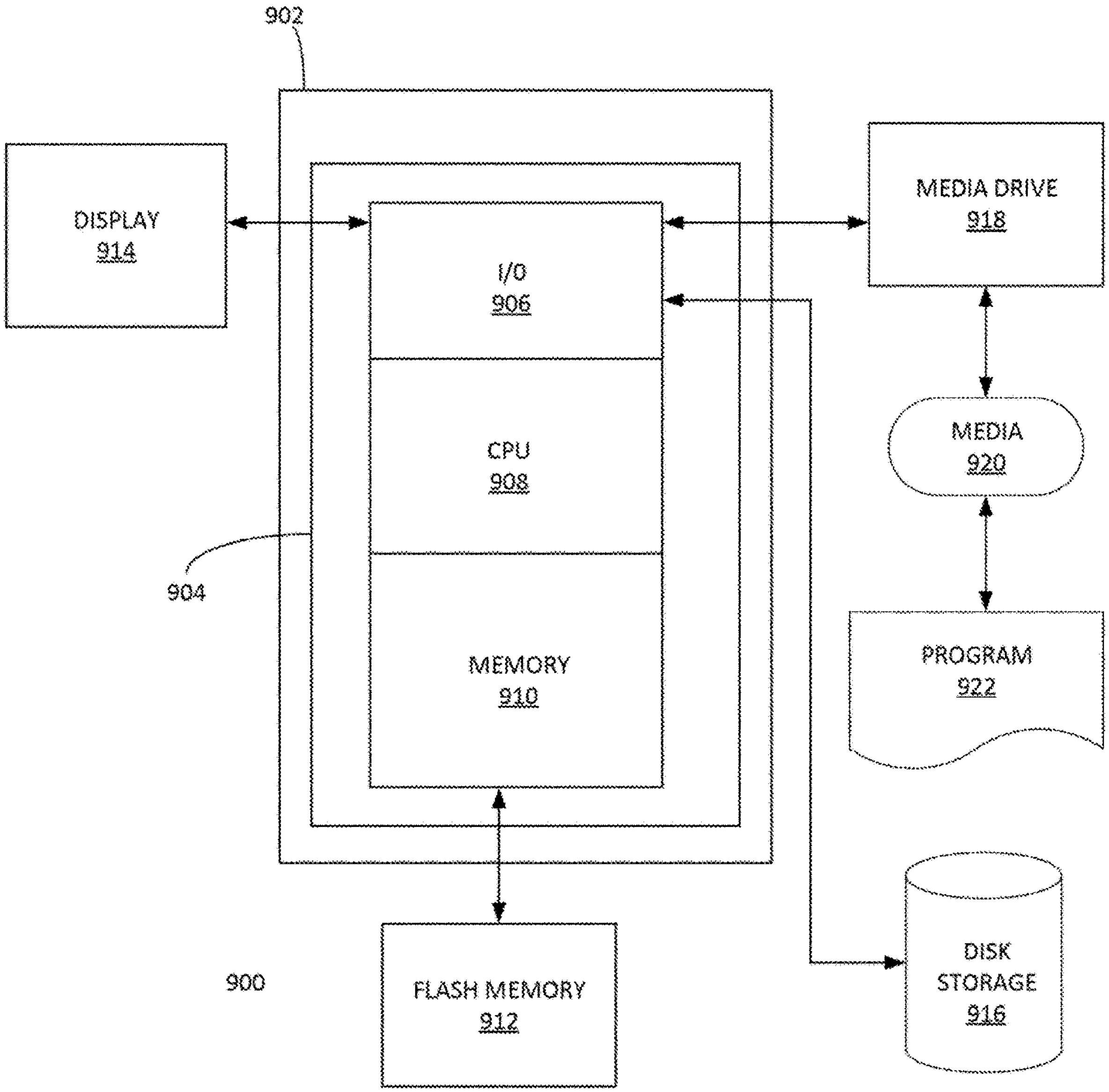
FIG. 9 depicts an exemplary computing system that can be configured to perform any one of the processes provided herein.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method comprising:

detecting, by a branch edge device, a loss of connectivity to a multipath hub, the multipath hub being associated with a logical ID;

sending, by the branch edge device, a new connection request to a gateway with the logical ID of the multipath hub;

receiving, by the branch edge device and from the gateway, selection of a new least loaded hub from a cluster of multipath hubs and connectivity information for the new least loaded hub; and establishing, by the branch edge device, a tunnel connectivity with the new least loaded hub using the connectivity information.

2. The method of claim 1, wherein the gateway logs the connectivity status of each reestablished connection.

3. The method of claim 1, further comprising providing a notification for the loss of connectivity.

4. The method of claim 1, further comprising providing a notification for establishing the tunnel connectivity.

5. The method of claim 1, wherein the new connection request comprises updated utilization statistics of the branch edge device.

6. The method of claim 1, further comprising prioritizing the new least loaded hub based on a predetermined hierarchy for the cluster of multipath hubs.

7. The method of claim 1, wherein the connectivity information comprises security credentials for establishing the tunnel.

8. The method of claim 1, further comprising encrypting the connectivity information.

9. The method of claim 1, wherein the new least loaded hub is selected based on monitoring of hub utilization.

10. The method of claim 1, wherein the branch edge device adjusts its traffic routing policies based on the connectivity information.

11. A non-transitory machine readable medium storing a program executed by one or more processing units, the program comprising sets of instructions for:

detecting, by a branch edge device, a loss of connectivity to a multipath hub, the multipath hub being associated with a logical ID;

sending, by the branch edge device, a new connection request to a gateway with the logical ID of the multipath hub;

receiving, by the branch edge device and from the gateway, selection of a new least loaded hub from a cluster of multipath hubs and connectivity information for the new least loaded hub; and establishing, by the branch edge device, a tunnel connectivity with the new least loaded hub using the connectivity information.

12. The non-transitory machine readable medium of claim 11, wherein the gateway logs the connectivity status of each reestablished connection.

13. The non-transitory machine readable medium of claim 11, wherein the program further comprises instructions for providing a notification for the loss of connectivity.

14. The non-transitory machine readable medium of claim 11, wherein the program further comprises instructions for providing a notification for establishing the tunnel connectivity.

15. The non-transitory machine readable medium of claim 11, wherein the new connection request comprises updated utilization statistics of the branch edge device.

16. The non-transitory machine readable medium of claim 11, wherein the program further comprises instructions for prioritizing the new least loaded hub based on a predetermined hierarchy for the cluster of multipath hubs.

17. The non-transitory machine readable medium of claim 11, wherein the connectivity information comprises security credentials for establishing the tunnel.

18. The non-transitory machine readable medium of claim 11, wherein the program further comprises instructions for comprising encrypting the connectivity information.

19. The non-transitory machine readable medium of claim 11, wherein the new least loaded hub is selected based on monitoring a hub utilization.

20. The non-transitory machine readable medium of claim 11, wherein the branch edge device adjusts its traffic routing policies based on the connectivity information.

* * * * *